United States Patent
Rood, Jr.

(10) Patent No.: US 12,252,058 B1
(45) Date of Patent: Mar. 18, 2025

(54) SPRAYER TANK SUPPORT FRAME ON A ROLL BAR OF A LAWN MOWER OR TRACTOR

(71) Applicant: Charles H. Rood, Jr., Youngsville, LA (US)

(72) Inventor: Charles H. Rood, Jr., Youngsville, LA (US)

( * ) Notice: Subject to any disclaimer, the term of this patent is extended or adjusted under 35 U.S.C. 154(b) by 770 days.

(21) Appl. No.: 17/490,488

(22) Filed: Sep. 30, 2021

Related U.S. Application Data

(60) Provisional application No. 63/085,886, filed on Sep. 30, 2020.

(51) Int. Cl.
| | | |
|---|---|---|
| *B60R 21/13* | (2006.01) | |
| *A01D 34/00* | (2006.01) | |
| *A01D 75/00* | (2006.01) | |
| *B60P 3/22* | (2006.01) | |

(52) U.S. Cl.
CPC .......... *B60P 3/2215* (2013.01); *A01D 34/001* (2013.01); *A01D 75/008* (2013.01); *B60R 21/131* (2013.01)

(58) Field of Classification Search
CPC ... A01D 34/001; A01D 75/008; B60P 3/2215; B60R 21/131; B60R 21/13; B60R 9/06
See application file for complete search history.

(56) References Cited

U.S. PATENT DOCUMENTS

| | | |
|---|---|---|
| 4,821,959 A | 4/1989 | Browning |
| 5,106,020 A | 4/1992 | Harrell |
| 5,344,225 A | 9/1994 | Blyth |
| 6,196,616 B1 | 3/2001 | Muszynski |
| 6,908,052 B1 | 6/2005 | Jacobson |
| 8,616,310 B2 | 12/2013 | Lopez |
| 9,079,544 B2 | 7/2015 | Miller et al. |
| 9,517,485 B1 | 12/2016 | Crosby, Jr. |
| D784,899 S | 4/2017 | McConnell et al. |
| 9,616,837 B1 * | 4/2017 | Bartel .................... B60R 21/131 |
| 9,907,231 B2 | 3/2018 | Ponce et al. |
| 10,259,287 B2 | 4/2019 | Reynolds |
| 10,426,081 B2 * | 10/2019 | Biers, Sr. .................. B60R 9/06 |

(Continued)

OTHER PUBLICATIONS

Precision Products 7-Foot Sprayer Boom TCB7 (available at https://www.amazon.com/Precision-Products-7-Foot-Sprayer-Boom/dp/B000PSTFAS/ref=asc_df_B000PSTFAS/?tag=hyprod-20&linkCode=df0&hvadid=416747%E2%80%A6) (visited Jun. 26, 2020).

(Continued)

*Primary Examiner* — Thomas B Will
*Assistant Examiner* — Robert E Pezzuto
(74) *Attorney, Agent, or Firm* — Garvey, Smith & Nehrbass, Patent Attorneys, L.L.C.; Julia M FitzPatrick; Charles C. Garvey, Jr.

(57) ABSTRACT

A sprayer tank support frame that can be selectively coupled to a roll bar of a lawn mower or tractor while the roll bar is in a raised/elevated position or in a lowered/retracted position. An operator can discharge contents of the sprayer tank while on the support frame in either the raised/elevated or lowered/retracted position and while operating the lawn mower or tractor. The sprayer tank support frame can be adapted to be a universal support frame for use with roll bars of differing sizes and/or dimensions. The sprayer tank support frame can be adapted to be a universal support frame for use with tanks of differing sizes and/or dimensions.

14 Claims, 18 Drawing Sheets

(56) References Cited

U.S. PATENT DOCUMENTS

| | | | |
|---|---|---|---|
| 10,602,658 B1 * | 3/2020 | Najpauer | A01C 23/007 |
| 11,135,990 B2 * | 10/2021 | Turner | B60R 21/131 |
| 2012/0180281 A1 | 7/2012 | Miller et al. | |
| 2018/0257468 A1 * | 9/2018 | Cook | B60J 7/1265 |

OTHER PUBLICATIONS

Tractor Tool Tray, Great Day Inc. (www.greatdayinc.com/products/lawn-garden-accessories/tractor-tool-tray/) (visited Jun. 26, 2020).
Great Day Tractor Tool-Tray (www.shop.opticsplanet.com/great-day-tractor-tool-tray.html?_iv_code=GDI-LGT-TT400) (visited Jun. 26, 2020).
Spartan Motors Sprayer Tray (www.spartanmowers.com/mower-accessories/page/31/sprayer-tray and photograph) (visited Jul. 6, 2020).
WorkHorse Hitch Mount Boom Kit (www.amleo.com/workhorse-hitch-mount-boom-kit/p/BK007HM) (visited July 6, 2020).
Big Tool Rack (www.bigtoolrack.com) (visited July 7, 2020).
Fourtreks Precision Off Road Products (www.fourtreks.com/roll_bar.html) (visited July 7,2020).
BigToolRack Yard Rack—Gempler's (www.gemplers.com/products/bigtoolrack-yard-rack?variant=31366011388019&utm_medium=cpc&utm_source=google&utm_campaign=Google and photograph) (visited Jul. 8, 2020).
BigToolRack RopsRackPack—Large Rollover Bar Carryall, Attach Work Tools on Your Tractor, ROPS Attachment, for Roll Bars Larger Than 2"x2" (www.amazon.com/BigToolRack-RepsRackPack%EF%BB%8F-Rollover-Carryall-At) (visited July 7, 2020).

* cited by examiner

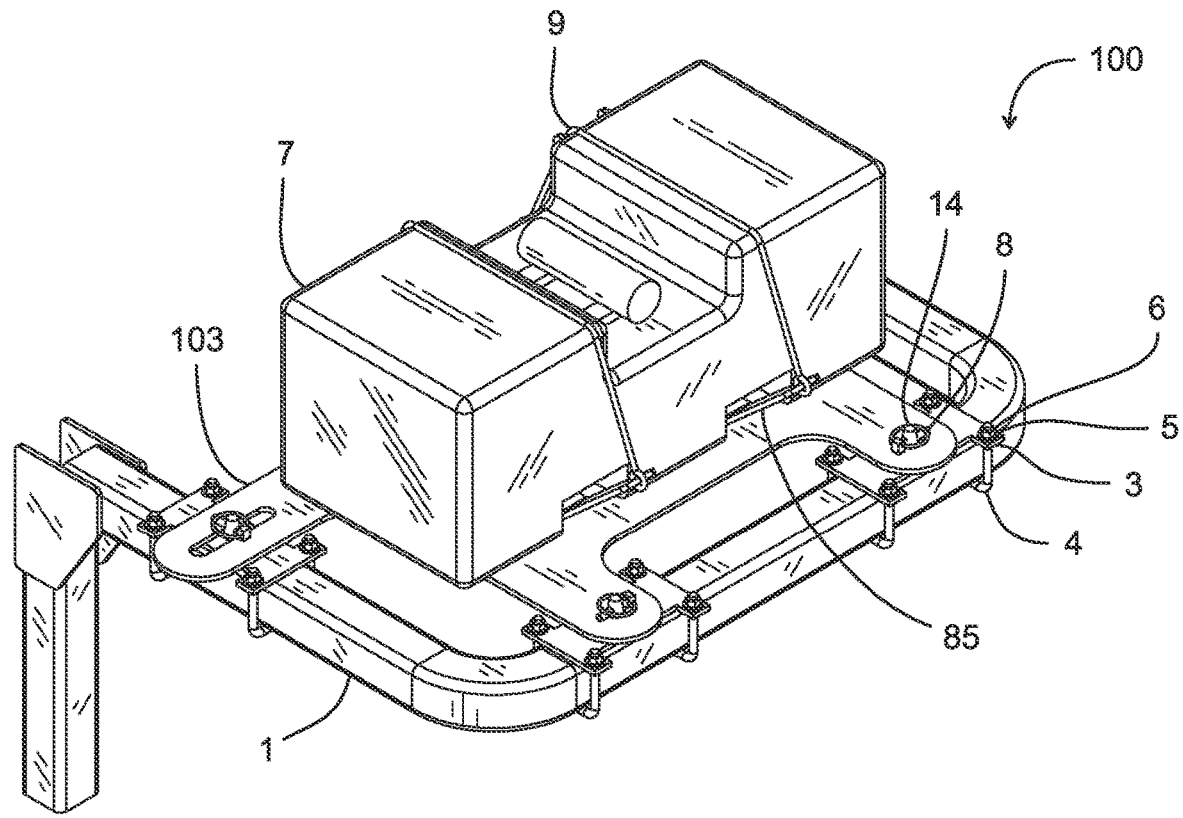
FIG. 20
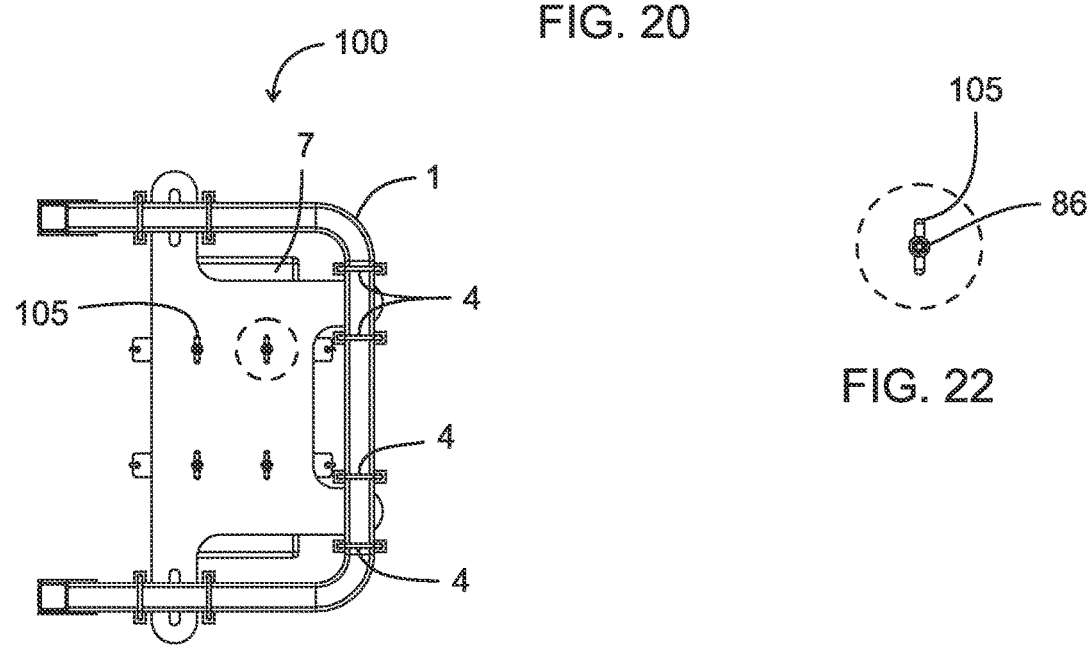
FIG. 21
FIG. 22

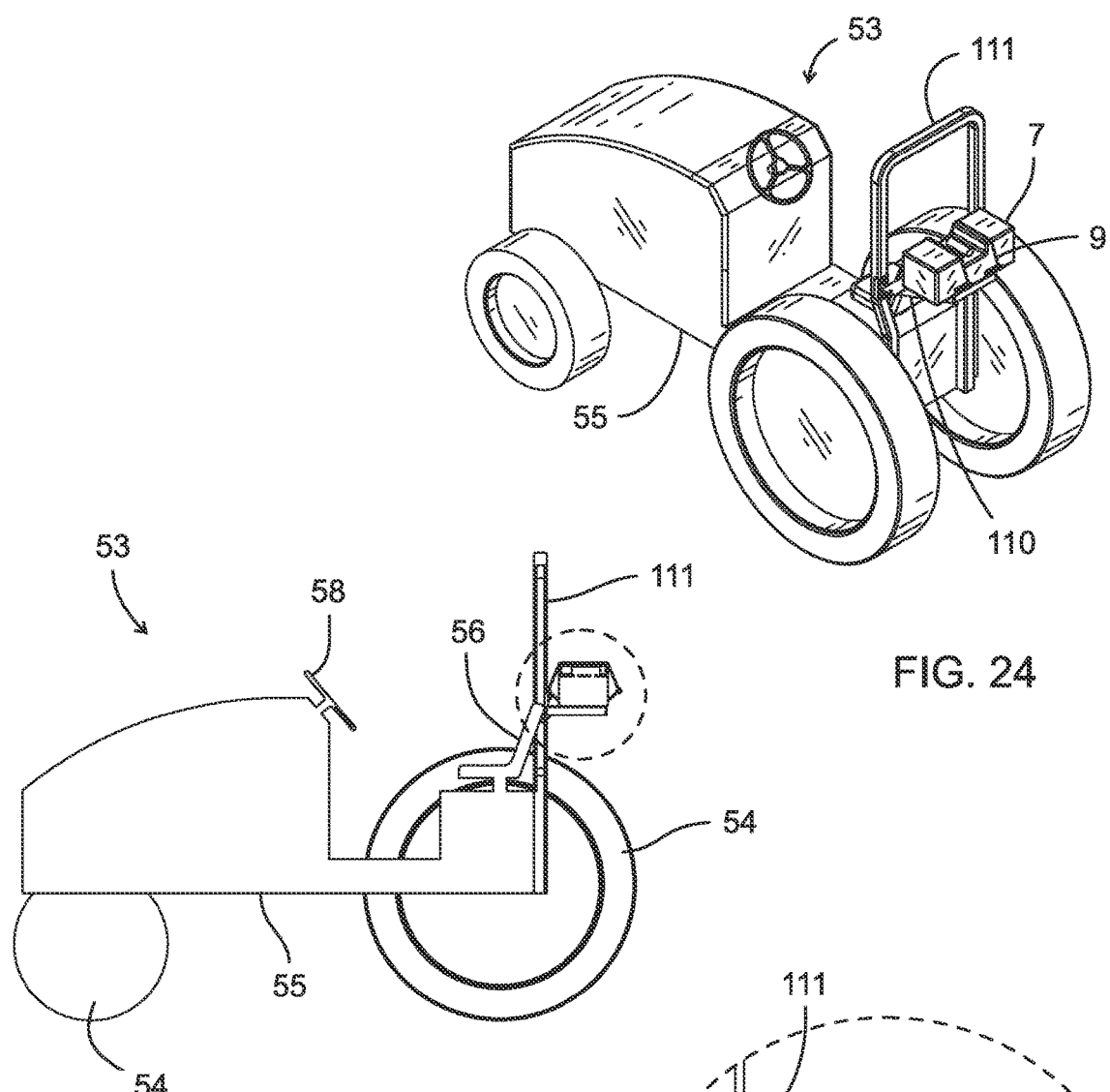
FIG. 24
FIG. 25
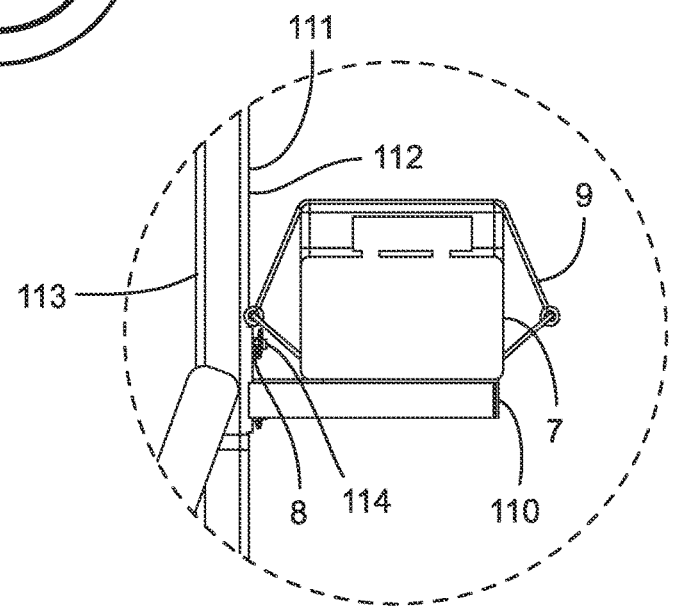
FIG. 26

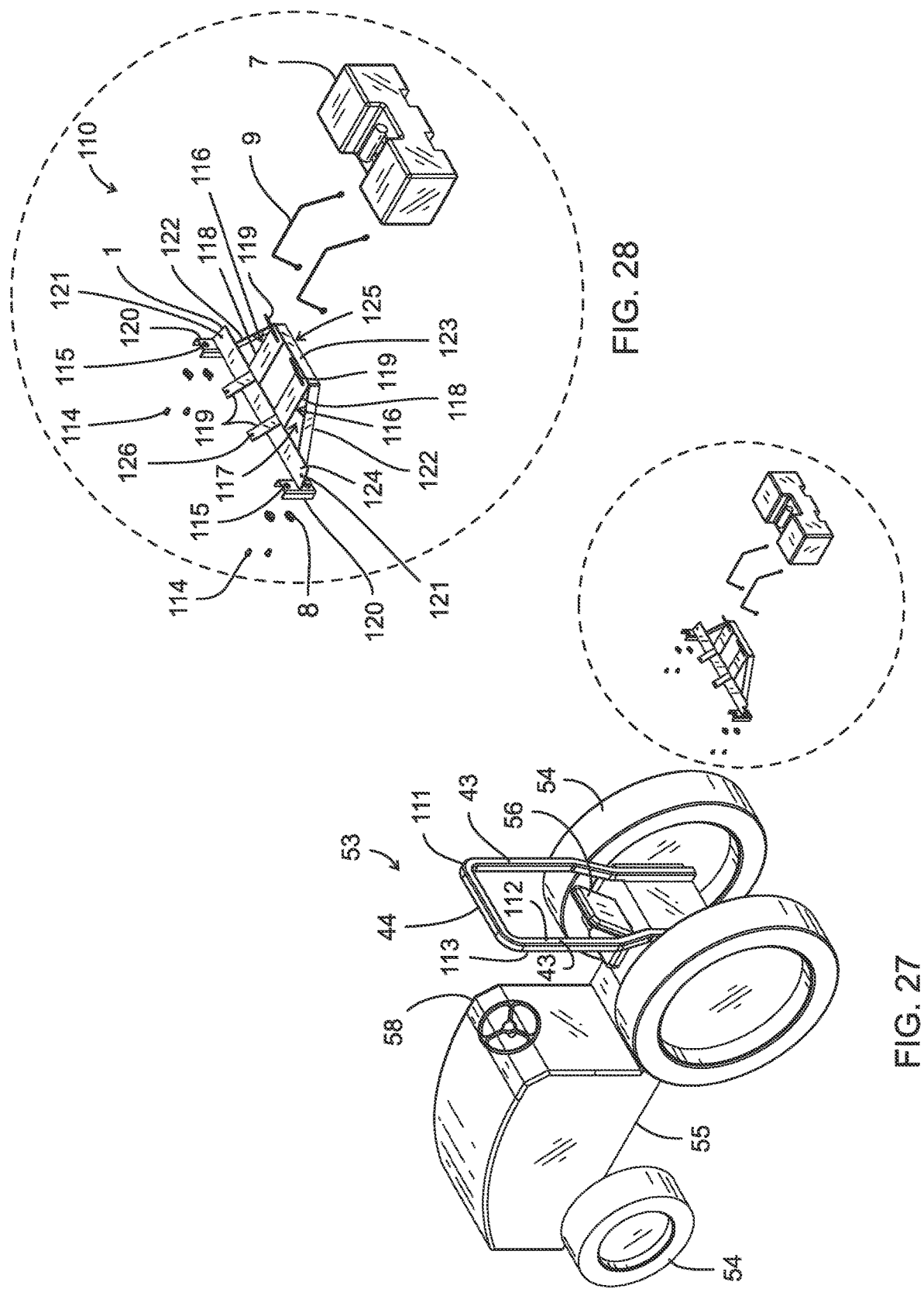

SPRAYER TANK SUPPORT FRAME ON A ROLL BAR OF A LAWN MOWER OR TRACTOR

CROSS-REFERENCE TO RELATED APPLICATIONS

Priority to and/or the benefit of U.S. Provisional Patent Application Ser. No. 63/085,886, filed on 30 Sep. 2020, which is hereby incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to a wheeled lawn care apparatus having a sprayer tank support frame for coupling to a roll bar of the wheeled lawn care apparatus (e.g., a lawn mower or tractor) frame. More particularly, the present invention relates to a support frame that can be selectively coupled to a roll bar of a lawn mower or tractor while the roll bar is in a raised/elevated position or in a lowered/retracted position. An operator can discharge contents of the sprayer tank while it is on the support frame that is coupled to a roll bar in either the raised/elevated or lowered/retracted position and while operating the lawn mower or tractor.

2. General Background of the Invention

Heavy duty lawn mowers having a substantial weight, e.g., 850 to 1,690 (or 600 to 1,690 plus) pounds or tractors typically include a rollover protective bar (also referred to herein as a roll bar or rollover protection system) that protects the operator in the event of a rollover of the lawn mower or tractor. Such heavy duty lawn mowers and tractors having a roll bar are usually used commercially, or on large land areas, e.g., farmland, or on land with uneven terrain or hills where a rollover situation can possibly occur. Examples of such heavy duty lawn mowers (e.g., zero turn lawn mowers) or tractors that are commercially available include John Deere®, Kubota®, HUSQUARNA®, Kawasaki®. Big Dog®, Snapper®, Yard Machine®, Simplicity®, and Echo® brand tractors or lawn mowers.

A specific example of a wheeled lawn care vehicle that is a tractor having a roll bar is the Kubota® sub-compact tractor model BX2680. An example of a wheeled lawn care vehicle that is a mower with a roll bar is Kubota® zero turn mower model No. ZD1211-60.

A roll bar is typically positioned on a lawn mower or tractor so that a transverse bar portion is at a position that is above a height of an operator's head. Many roll bars are retractable and can be moved from an elevated position with a transverse bar portion at a position above an operator's head to a lowered position with the transverse bar portion positioned at a lower height, e.g., wherein the transverse bar portion is movable via one or more hinges. An operator can selectively choose whether to operate the lawn mower or tractor while the roll bar is raised/elevated or lowered/retracted. An operator may choose to operate the lawn mower or tractor while the roll bar is lowered or retracted, for example, when the roll bar may hit low lying tree limbs or branches.

In the prior art, a rack or tray that can support a larger sprayer tank, e.g., an 8 to 30 gallon sprayer tank, is sometimes attached to a front of a lawn mower or tractor, or a rear of a lawn mower or tractor, e.g., at a hitch. In such a position, however, the sprayer tank is not easily accessible for spraying and often contacts the ground while the lawn mower or tractor is being operated, especially on uneven earth surfaces or terrain.

There are some accessory or tool holders in the prior art for attaching to a roll bar of a lawn mower or tractor that can include a small spray bottle, e.g., holding a pint to a quart of sprayer fluid, but there is a need for a support frame that is attachable to a roll bar of a lawn mower or tractor that can support a large sprayer tank designed for spraying large land areas, e.g., 1 to 200 or more acres, e.g., an 8 to 30 gallon sprayer tank, or a 1 to 300 gallon sprayer tank and which is easily accessible for spraying while operating the lawn mower or tractor. In one or more embodiments, a support frame of the present invention can be fabricated to accommodate even larger tanks for use on even larger land areas.

There is also a need in the art for a sprayer tank support frame that can be selectively positioned on a roll bar when the roll bar is elevated/raised or retracted/lowered, and which can be used while on the roll bar in an elevated/raised or retracted/lowered position.

There is also a need in the art for a sprayer tank support frame that can be positioned on a roll bar when the roll bar is elevated/raised, and which can be used while on the roll bar in an elevated/raised position.

There is also a need in the art for a sprayer tank support frame that can be positioned on a roll bar when the roll bar is retracted/lowered, and which can be used while on the roll bar in a retracted/lowered position.

There is also a need in the art for a sprayer tank support frame that is easily attachable and detachable to a roll bar of a lawn mower or tractor or other wheeled lawn care apparatus. There is also a need in the art for a sprayer tank support frame that can be coupled to roll bars of different sizes and dimensions, which is sometimes referred to herein as a universal sprayer tank support frame or rack.

The following U.S. Patents are incorporated herein by reference:

| Pat. No. | Title | Issue Date |
| --- | --- | --- |
| 4,821,959 | Pump and Sprayer Attachments for Lawn Mowers | Apr. 18, 1989 |
| 5,106,020 | Spray Attachment for Lawn Mowers | Apr. 21, 1992 |
| 5,344,225 | Lawn Mower Attachment | Sep. 6, 1994 |
| 6,196,616 | Vehicle Top Accessory | Mar. 6, 2001 |
| 6,908,052 | Lawn Mower Sprayer Assembly | Jun. 21, 2005 |
| 8,616,310 | Apparatus for Farming, Gardening and Landscaping | Dec. 31, 2013 |
| 9,079,544 | Accessory Mounting Apparatus for a Vehicle | Jul. 14, 2015 |
| 9,517,485 | Lawn-Mower Mounted Sprayers, Assemblies, Components, and Methods | Dec. 13, 2016 |
| 9,907,231 | Lawn Mower Caddy | Mar. 6, 2018 |
| 10,259,287 | Air Conditioning System for an Open Motorized Vehicle | Apr. 16, 2019 |
| D784,899 | Roll-Over Protective Structure | Apr. 25, 2017 |
| 2012/0180281 | Accessory Mounting Apparatus for a Vehicle | Jul. 19, 2012 |

The following web pages and documents are hereby incorporated herein by reference.

https://www.amazon.com—Precision Products 7 Foo Sprayer Boom TCB7 . . .
https://www.spartanmowers.com—Build-Your-Own-Mower/Frame . . .
https://shop.opticsplanet.com/Great Day Tractor Tool-Tray . . .
https:/www.greatdayinc.com/products/lawn-garden-accessories/Tractor Tool Tray . . .
https://www.amleo.com/new-workhorse-hitch-mount-boom-kit . . .
https://www.bigtoolrack.com/ropsrackpack
http://www.fourtreks.com/roll_bar.html
https://www.amazon.com/BigToolRack-RopsRackPack . . .
https://gemplers.com/products/bigtoolrack-yard-rack . . .
image BigToolRack basket

BRIEF SUMMARY OF THE INVENTION

The apparatuses and methods of the present invention solves the problems confronted in the art in a simple and straightforward manner. What is provided is a sprayer tank support frame than can be coupled to a rollover protective bar (roll bar) of a wheeled vehicle, e.g., a lawn mower or tractor. Preferably a support frame of the present invention can be selectively coupled to a roll bar of a lawn mower or tractor while the roll bar is in a raised/elevated position or in a lowered/retracted position. Alternatively, the support frame can be coupled to a roll bar of a lawn mower or tractor only when the roll bar is in an elevated position, e.g., for use on a roll bar having a fixed position and which cannot be lowered or retracted. Alternatively, the support frame can be coupled to a roll bar of lawn mower or tractor only when the roll bar is in a lowered position. An operator can discharge contents of the sprayer tank while the sprayer tank is on the support frame in either the lowered or retracted position and while operating the lawn mower or tractor. Preferably, the support frame is designed to carry a large sprayer tank, e.g., a tank that can hold 8 to 30 gallons. A support frame of the present invention can also hold a smaller tank, e.g., a tank that can hold 1 to 7 gallons, if desired. A support frame of the present invention can also be adapted to hold an even larger tank, e.g., a tank that can hold 31 to 300 gallons, if desired. For tanks of this size, the dimensions of the support frame can be increased and additional load bearing members or supports can be included to support the heavier weight and larger size of such a tank.

In some preferred embodiments, the support frame has openings of a desired size and shape, e.g., slotted openings, that enable connection of the support frame to roll bars of different sizes and dimensions. In some preferred embodiments, a support frame rack portion can be coupled to a frame in slots enabling adjustment of a distance between saddles that can hold a tank therein, e.g., for accommodating different size tanks.

In one or more preferred embodiments of the present invention, a wheeled lawn care vehicle having an implement for performing one or more landscaping duties, comprises:
  a) a chassis having multiple wheels, an operator's seat, an engine, and one or more steering devices;
  b) a roll bar that protects the operator in event of a rollover, said roll bar having opposed hinges, an upper section above the hinges and a lower portion below the hinges, wherein the upper section includes a transverse bar portion and is movable between elevated and lowered positions, wherein said upper section and said lower portion include longitudinal supports, and wherein the longitudinal supports of the upper section are moveable between elevated and lowered positions;
  c) wherein in said lowered position, said roll bar upper section is generally laterally extending;
  d) first and second brackets, each attachable to said roll bar upper section with one or more connectors and selectively when said roll bar is in said elevated or said lowered position;
  e) a sprayer tank that has an interior for holding a volume of liquid to be sprayed until substantially drained;
  f) a sprayer tank support frame connectable to said first and second brackets and selectively when said roll bar is in said elevated or said lowered position;
  g) wherein said sprayer tank is selectively attachable to said sprayer tank support frame in either said elevated or said lowered position; and
  h) wherein in either said elevated or said lowered position said sprayer tank is oriented to substantially drain as the volume of liquid is discharged.

In one or more preferred embodiments of the present invention, the chassis defines a portion of a lawn mower.

In one or more preferred embodiments of the present invention, the chassis defines a portion of a tractor.

In one or more preferred embodiments of the present invention, the sprayer tank support frame includes a flanged connector for resting on at least a portion of the transverse bar portion when the transverse bar portion in is the lowered position.

In one or more preferred embodiments of the present invention, the frame has one or more openings that are receptive of said one or more connectors of said brackets.

In one or more preferred embodiments of the present invention, the one or more openings are slots, and wherein the position of a said connector of a said bracket can be moved within a said slot to a desired position that can generally align with a said longitudinal support of the roll bar.

In one or more preferred embodiments of the present invention, the slots enable the frame to be used with roll bars that have differing widths between longitudinal support members.

In one or more preferred embodiments of the present invention, the slots are 0.25 to 8 inches long.

In one or more preferred embodiments of the present invention, the slots are between 0.1 and 10 inches long.

In one or more preferred embodiments of the present invention, the one or more connector is a locking pin.

In one or more preferred embodiments of the present invention, the one or more connectors are a locking pin or a clamp.

In one or more preferred embodiments of the present invention, a support frame for mounting to a lawn mower or tractor for supporting a sprayer tank during spraying or when not spraying, the support frame comprises:
  a) a lateral mounting plate having a first end and a second end, and having a first opening positioned on the first end and a second opening positioned on the second end;
  b) a first longitudinal mounting plate having a third opening and a second longitudinal mounting plate having a fourth opening, wherein the first longitudinal mounting plate is coupled to the lateral mounting plate at the first end and the second longitudinal mounting plate is coupled to the lateral mounting plate at the second end;

c) a pair of connector plates, each said connector plate having a first fastener, a first connector plate end and a second connector plate end, the first connector plate end having a pair of fifth openings and the second connector plate end having a pair of sixth openings, the pair of fifth openings adapted for receiving a second fastener and the pair of sixth openings adapted for receiving a third fastener;

d) a rack portion having a lower fixed section and an upper section that is pivotally connected to said lower section;

e) wherein the frame is adapted to be removably coupled to a lawn mower or tractor roll bar upper section when the roll bar upper section is extended to an elevated position or retracted to a lowered position;

f) wherein each said first fastener of the pair of connector plates is configured to removably couple one said connector plate to the frame at the lateral mounting plate, at the first longitudinal mounting plate, or at the second longitudinal mounting plate;

g) wherein the second fastener and the third fastener are each adapted to fit at least partially around the roll bar and to removably couple one said connector plate to the roll bar;

h) wherein the pair of connector plates couple the frame to the roll bar in the extended position when the first fastener of one said connector plate is positioned in the third opening of the first longitudinal mounting plate and the first fastener of the other said connector plate is positioned in the fourth opening of the second longitudinal mounting plate and when a said second fastener is positioned at least partially around the roll bar and through the pair of fifth openings of each said connector plate and the third fastener is positioned at least partially around the roll bar and through the pair of sixth openings of each said connector plate; and i) wherein the pair of connector plates couple the frame to the roll bar in the retracted position when the first fastener of one said connector plate is positioned in the first opening on the first longitudinal mounting plate and the first fastener of the other said connector plate is positioned in the second opening on the longitudinal mounting plate and when a said second fastener is positioned at least partially around the roll bar and in the pair of fifth openings of each said connector plate and a said third fastener is positioned at least partially around the roll bar and in the pair of sixth openings of each said connector plate.

In one or more preferred embodiments of the present invention, the rack portion is adapted to support the sprayer tank having a volume of between 5-30 gallons of fluid therein.

In one or more preferred embodiments of the present invention, the rack portion is adapted to support the sprayer tank having a volume of between 0-30 gallons of fluid therein.

In one or more preferred embodiments of the present invention, the rack portion is adapted to support the sprayer tank having a volume of between 31 to 300 gallons of fluid therein.

In one or more preferred embodiments of the present invention, the rack portion is coupled to the lateral mounting plate and has a pair of cross beams each with a cross beam first end and a cross beam second end, a first side plate and a second side plate, wherein the first side plate extends upward at an angle from the cross beam first end and the second side plate extends upward at an angle from the cross beam second end, and wherein the pair of cross beams are adapted to support the sprayer tank in between said first side plates and said second side plates.

In one or more preferred embodiments of the present invention, the rack portion can include one or more openings through which a strap or bungee cord can be threaded through to help secure the sprayer tank to the rack portion.

In one or more preferred embodiments of the present invention, a frame further comprises one or more flanged connectors having an at least substantially u-shape for being positioned at least partially around the roll bar and resting on the roll bar when in the retracted position.

In one or more preferred embodiments of the present invention, a frame further comprises a pair of opposing side beams each having a center portion, a first sidewall portion and a second sidewall portion wherein the center portion of each of the pair of opposing side beams extends from the lateral mounting plate to the rack portion at an angle.

In one or more preferred embodiments of the present invention, the frame first sidewall portion and the second sidewall portion defines a sidewall of one said flanged connector.

In one or more preferred embodiments of the present invention, each cross beam of the rack portion is sized to fit within a recess of the tank.

In one or more preferred embodiments of the present invention, the roll bar has a lower portion that does not retract and an upper portion that does retract and wherein the pair of connector plates are adapted to couple the frame to the upper portion of the roll bar when in the retracted position at an angle of at least substantially 90 degrees respective to the lower portion of the roll bar.

In one or more preferred embodiments of the present invention, a frame comprises a roll bar support or stop adapted to hold a roll bar upper portion in an at least substantially horizontal position.

In one or more preferred embodiments of the present invention, a frame comprises a roll bar support or stop adapted to hold a roll bar upper portion in an at least substantially lateral position.

In one or more preferred embodiments of the present invention, the roll bar support is coupled to the lower bar portion.

In one or more preferred embodiments of the present invention, the roll bar has a lower portion that does not retract and an upper portion that does retract and wherein the pair of connector plates are adapted to couple the frame to the upper portion of the roll bar that is in the retracted position that is at least substantially horizontal respective to the lower portion of the roll bar.

In one or more preferred embodiments of the present invention, the first opening, the second opening, the third opening, and the fourth opening are slotted.

In one or more preferred embodiments of the present invention, a wheeled vehicle having an implement for performing one or more landscaping duties, comprises:

a) a chassis having multiple wheels, an operator's seat, an engine, and one or more steering devices;

b) a roll bar that protects an operator in event of a rollover, said roll bar having opposed hinges, an upper section above the hinges, and a lower section having a longitudinal axis below the hinges, wherein the upper section is movable between elevated and lowered positions about the hinges;

c) wherein in the elevated position, the upper section of the roll bar is generally aligned with the longitudinal axis of the lower section;

e) a removable support frame for a sprayer tank;

f) a fastener kit enabling a user to selectively couple the support frame to the roll bar upper section when the upper section is either in the elevated position or in the lowered position.

In one or more preferred embodiments of the present invention, the support frame can selectively support a sprayer tank that houses a desired amount of fluid in the range of 8 to 30 gallons of fluid.

In one or more preferred embodiments of the present invention, the fastener kit is adapted to connect the support frame to roll bars having varying widths between longitudinal members.

In one or more preferred embodiments of the present invention, a method of discharging sprayer fluid while operating a wheeled vehicle comprises the steps of:

a) coupling a sprayer tank support frame to a roll bar of a wheeled vehicle having an implement for performing one or more landscaping duties and having a chassis having multiple wheels, an operator's seat, an engine, and one or more steering devices, and wherein the roll bar includes an upper section that is moveable between elevated and lowered positions;

b) coupling a sprayer tank to the sprayer tank support frame of step "a", the sprayer tank having an interior for holding a volume of fluid to be sprayed, a hose and a nozzle on the hose;

c) discharging or spraying the fluid from the sprayer tank via the hose and nozzle while operating the vehicle; and d) wherein the sprayer tank support frame is selectively connectable to the roll bar upper section when the upper section is elevated or when the upper section is lowered.

In one or more preferred embodiments of the present invention, the support frame is coupled to the roll bar when the roll bar is in a raised position.

In one or more preferred embodiments of the present invention, the support frame is selectively coupled to the roll bar when the roll is in a raised position or in a lowered position.

In one or more preferred embodiments of the present invention, the support frame is adapted to support a sprayer tank that can house 8 to 30 gallons of the fluid.

In one or more preferred embodiments, the present invention includes a wheeled vehicle having an implement for performing one or more landscaping duties, comprising:

a) a chassis having multiple wheels, an operator's seat, an engine, and one or more steering devices;

b) a roll bar that protects the operator in the event of a rollover, said roll bar having opposed hinges, an upper section above the hinges and a lower portion below the hinges, wherein the upper section includes a transverse bar portion and is movable between elevated and lowered positions;

c) wherein in said lowered position, said roll bar upper section is laterally extending;

d) first and second brackets, each attachable to said bar upper section and selectively when said bar is in said elevated or said lowered position, each said bracket having a locking pin;

e) a sprayer tank that has an interior for holding a volume of liquid to be sprayed until substantially drained;

f) a sprayer tank support frame connectable to said brackets and selectively when said roll bar is in said elevated or said lowered position;

g) said frame having openings that are receptive of said locking pins of said brackets;

h) wherein said sprayer tank is selectively attachable to said sprayer tank support frame in either said elevated or said lowered roll bar position;

i) wherein in either said elevated or said lowered position said sprayer tank is oriented to substantially drain as the sprayer tank contents are discharged;

j) wherein in said elevated position said locking pins extend rearwardly and in said lowered position said locking pins extend upwardly.

In one or more preferred embodiments of a wheeled vehicle, the chassis defines a portion of a lawn mower.

In one or more preferred embodiments of a wheeled vehicle, the chassis defines a portion of a tractor.

In one or more preferred embodiments, the frame includes a flanged connector for resting on the transverse portion of the frame.

In one or more preferred embodiments, the frame includes a flanged connector sized to be positioned partially around the transverse bar portion of the frame in the retracted position. One or more preferred embodiments of the present invention includes a support frame for mounting to a lawn mower or tractor for supporting a sprayer tank during spraying or when not spraying, the frame comprising:

a) a lateral mounting plate having a first end and a second end, and having a first opening positioned on the first end and a second opening positioned on the second end;

b) a first longitudinal mounting plate having a third opening and a second longitudinal mounting plate having a fourth opening, wherein the first longitudinal mounting plate is coupled to the lateral mounting plate at the first end and the second longitudinal mounting plate is coupled to the lateral mounting plate at the second end;

c) a pair of connector plates, each said connector plate having a first fastener, a first connector plate end and a second connector plate end, the first connector plate end having a pair of fifth openings and the second connector plate end having a pair of sixth openings, the pair of fifth openings adapted for receiving a second fastener and the pair of sixth openings adapted for receiving a third fastener;

d) a rack portion;

e) wherein the frame is adapted to be removably coupled to a lawn mower or tractor roll bar when the roll bar is extended in a longitudinal position or retracted in a lateral position;

f) wherein each said first fastener of the pair of connector plates is adapted to removably couple one said connector plate to the frame at the lateral mounting plate, at the first longitudinal mounting plate, or at the second longitudinal mounting plate;

g) wherein the second fastener and the third fastener are each adapted to fit at least partially around the roll bar and to removably couple one said connector plate to the roll bar;

h) wherein the pair of connector plates couple the frame to the roll bar in the extended position when the first fastener of one said connector plate is positioned in the third opening of the first longitudinal mounting plate and the first fastener of the other said connector plate is positioned in the fourth opening of the second longitudinal mounting plate and when a said second fastener is positioned at least partially around the roll bar and through the pair of fifth openings of each said connector plate and the third fastener is positioned at least partially around the roll bar and through the pair of sixth openings of each said connector plate; and i) wherein the pair of connector plates couple the frame to the roll bar in the retracted position when the first fastener of one said connector plate is positioned in the first opening on the first longitudinal mounting plate and the first fastener of the other said connector plate is positioned in the second opening on the longitudinal mounting plate and when a said second fastener is positioned at least partially around the roll bar and in the pair of fifth openings of each said connector plate and a said third fastener is positioned at least partially around the roll bar and in the pair of sixth openings of each said connector plate.

In one or more preferred embodiments, the support frame is adapted to support a tank that can hold 8 to 30 gallons of sprayer fluid.

In one or more preferred embodiments, the rack portion is adapted to support a tank that can hold 8 to 30 gallons of sprayer fluid.

In one or more preferred embodiments, the rack portion is coupled to the lateral mounting plate and has a pair of cross beams each with a cross beam first end and a cross beam second end, a first side plate and a second side plate, wherein the first side plate extends upward at an angle preferably over 90 degrees from the cross beam first end, respective to a lateral axis of the cross beam, and the second side plate extends upward at an angle preferably over 90 degrees from the cross beam second end, respective to a lateral axis of the cross beam, and wherein the pair of cross beams are adapted to support the tank in between said first side plates and said second side plates. With respective to a lateral axis of the lateral mounting plate, a first side plate can have an acute angle or an angle between 0 and 90 degrees.

In one or more preferred embodiments, the rack portion can include one or more openings through which a strap or bungee cord can be positioned to help secure the tank to the rack portion.

In one or more preferred embodiments, the support frame includes one or more flanged connectors having an at least substantially u-shape for being positioned at least partially around the roll bar and/or for resting on the roll bar in the lowered/retracted position.

In one or more preferred embodiments, the support frame further comprises a pair of opposing side beams each having a center portion, a first sidewall portion and a second sidewall portion wherein the center portion of each of the pair of opposing side beams extends from under the lateral mounting plate to the rack portion at an angle between 0 and 90 degrees, respective to a lateral axis of the lateral mounting plate . . .

In one or more preferred embodiments, the support frame further comprises a pair of opposing side beams each having a center portion, a first sidewall portion and a second sidewall portion wherein the center portion of each of the pair of opposing side beams extends from under the lateral mounting plate to the rack portion at an angle between 0 and 90 degrees, respective to a lateral axis of the lateral mounting plate, and wherein the first sidewall portion and the second sidewall portion defines a sidewall of a flanged connector for resting on and/or being positioned at least partially around the roll bar.

In one or more preferred embodiments, each cross beam of the rack portion is sized to fit within a recess of the tank.

In one or more preferred embodiments, a sprayer tank support frame of the present invention is easily attachable or detachable from a roll bar of a lawn mower, tractor or other wheeled lawn care apparatus, e.g., with an on/off pin fastener system.

In one or more preferred embodiments, a sprayer tank support frame of the present invention is easy to handle and light weight for attaching to a roll bar of a lawn mower, tractor or other wheeled lawn care apparatus.

In one or more preferred embodiments, a sprayer tank support frame of the present invention is easy to handle and light weight for attaching to a roll bar of a lawn mower, tractor or other wheeled lawn care apparatus, for a supporting a large sprayer tank, e.g., a 8 to 30 gallon sprayer tank.

In one or more preferred embodiments, a sprayer tank support frame of the present invention is made from a recyclable material, e.g., aluminum.

In one or more preferred embodiments, a sprayer tank support frame of the present invention is weld modifiable.

In one or more preferred embodiments, a sprayer tank support frame of the present invention is adaptable for use with a roll bar of any lawn mower, tractor or other wheeled lawn care apparatus.

In one or more preferred embodiments, a sprayer tank support frame of the present invention is not a permanent feature of a lawn mower or tractor and is removably attachable to a roll bar of any lawn mower, tractor or other wheeled lawn care apparatus.

In one or more preferred embodiments, a sprayer tank support frame of the present invention can be a permanent feature of a lawn mower or tractor that is attached to a roll bar of any desired lawn mower, tractor or other wheeled lawn care apparatus having a roll bar.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 20 is a perspective view of a fifth preferred embodiment of a sprayer support frame of the present invention;

FIG. 21 is a bottom view of the fifth preferred embodiment of the present invention;

FIG. 22 is a partial detail view of the fifth preferred embodiment of the present invention;

FIG. 24 is a perspective view of a sixth preferred embodiment of a sprayer support frame of the present invention on a wheeled lawn care apparatus;

FIG. 25 is a side view of the sixth preferred embodiment of the present invention;

FIG. 26 is a partial detail side view of the sixth preferred embodiment of the present invention as shown in FIG. 25;

FIG. 27 is an exploded view of the sixth preferred embodiment of the present invention;

FIG. 28 is a detail view of a sixth preferred embodiment of the present invention;

DETAILED DESCRIPTION OF THE INVENTION

Figure 10:
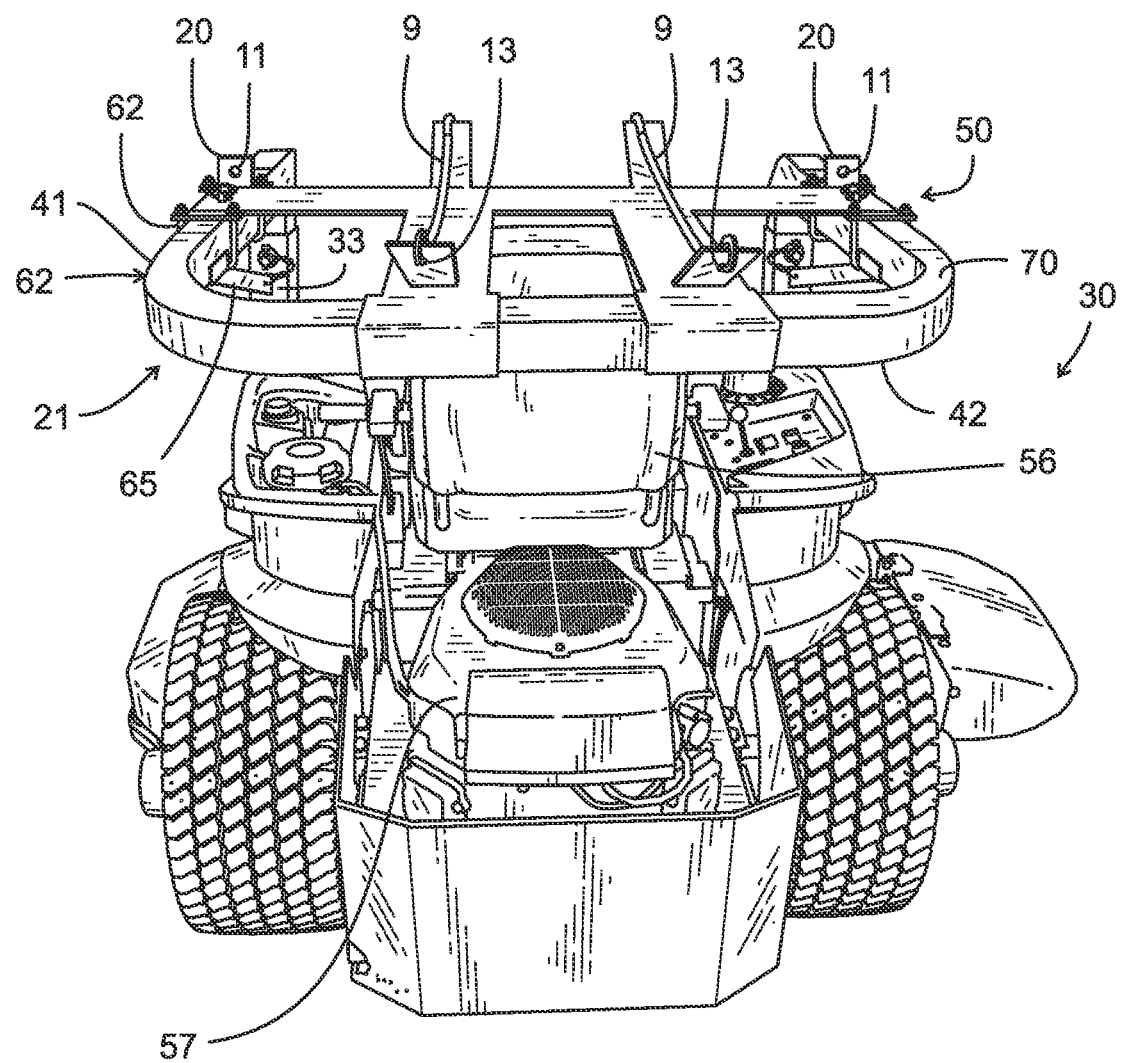
FIGS. 10-11 are rear views of a third preferred embodiment of a frame or rack of the present invention coupled to a wheeled lawn care apparatus with a sprayer tank thereon.
Figure 11:
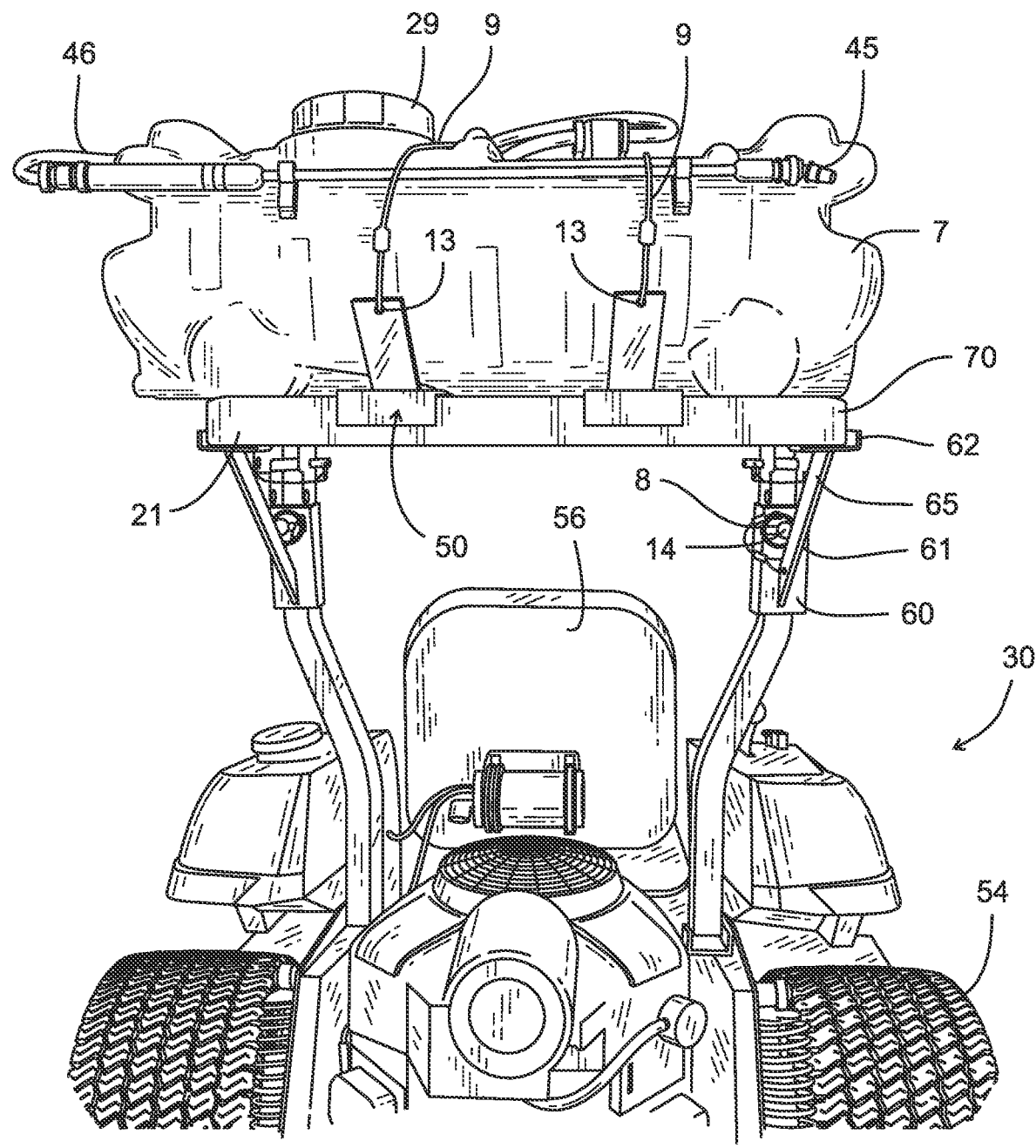
Figure 12:
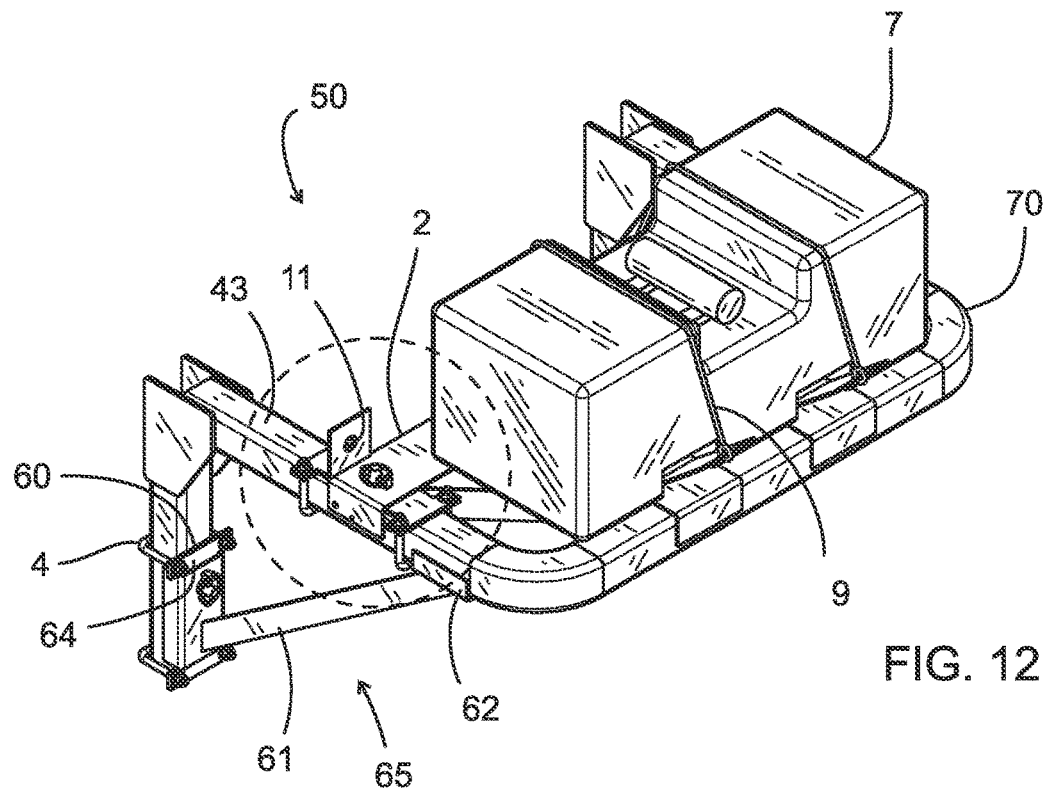
FIG. 12 is a perspective view of a third preferred embodiment of a sprayer support frame of the present invention including a roll bar diagonal support that can be used with a roll bar that can be retracted at angle over 90 degrees.
Figure 13:
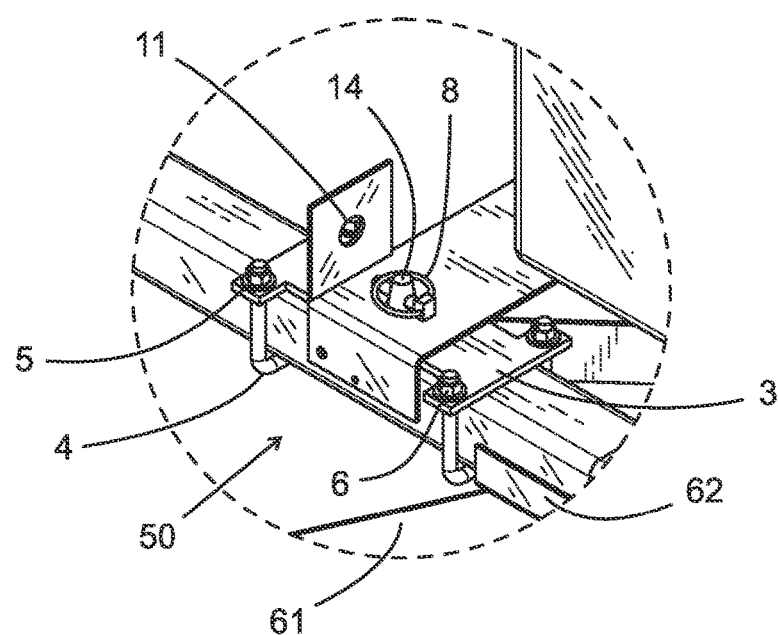
FIG. 13 is a detail view of a third preferred embodiment of a sprayer support frame of the present invention.

FIGS. 1-6 and show a first preferred embodiment of the apparatus of the present invention designated generally by the numeral 10. Rack or frame or sprayer rack 10 can be used with any wheeled lawn care vehicle 30 having a rollover protection system or roll bar such as a mower, tractor, or zero turn mower (e.g., tractor 53 in FIG. 24 or zero turn mover 30 seen in FIGS. 10-11). A wheeled lawn care apparatus or vehicle 30 can be equipped with a support frame or rack 10 of the present invention. Rack or frame 10 can be selectively attached to a roll bar 1, 70, 111 of a wheeled vehicle 30, 53 in an elevated/upright/raised position (see, e.g., FIGS. 1-3 and 7-8) or to a roll bar 1, 70 of a wheeled vehicle 30 in a lowered/retracted position (see, e.g., FIGS. 4-6) and configured to hold a sprayer tank 7 thereon.

Figure 7:
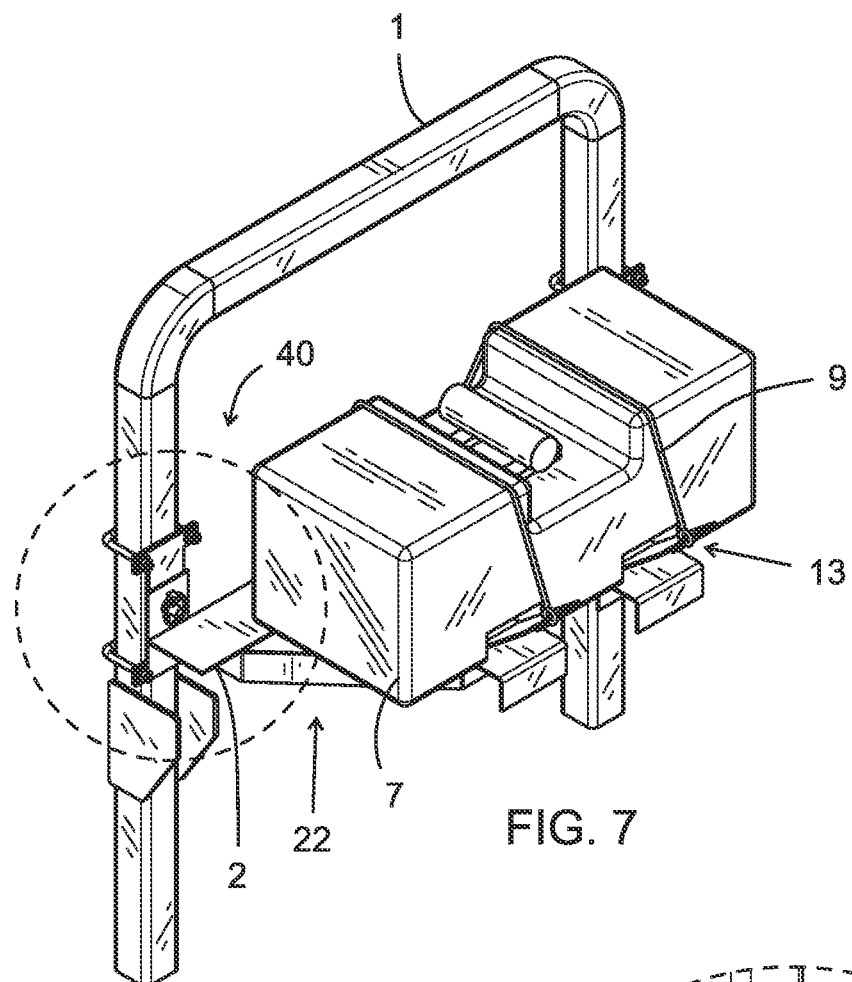
FIG. 7 is a perspective view of a second preferred embodiment of a frame or rack of the present invention coupled to a rollover protective structure of a lawn mower or tractor in an extended or up position.
Figure 8:
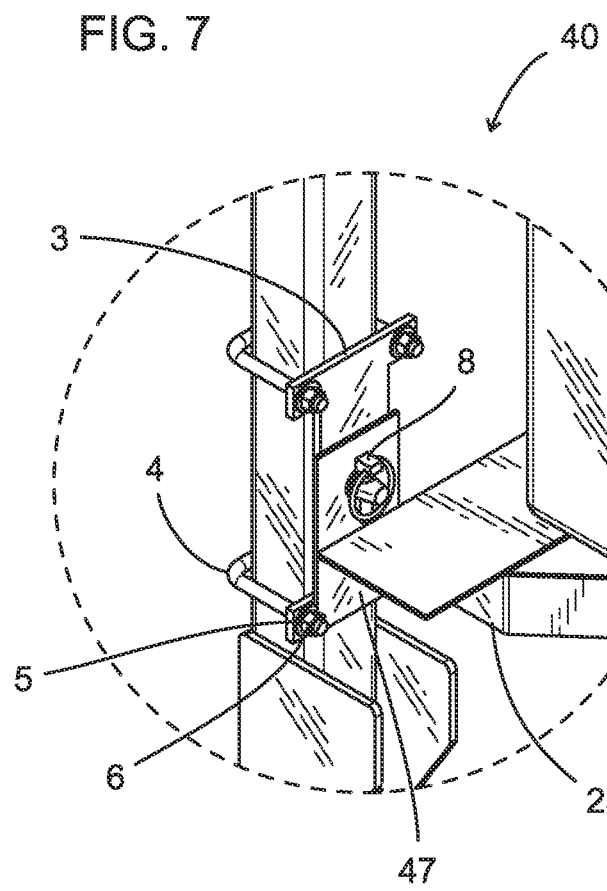
FIG. 8 is a detail view including a preferred embodiment of a connector plate or roll bar mount of a preferred embodiment of the present invention as shown in FIG. 7.
Figure 9:
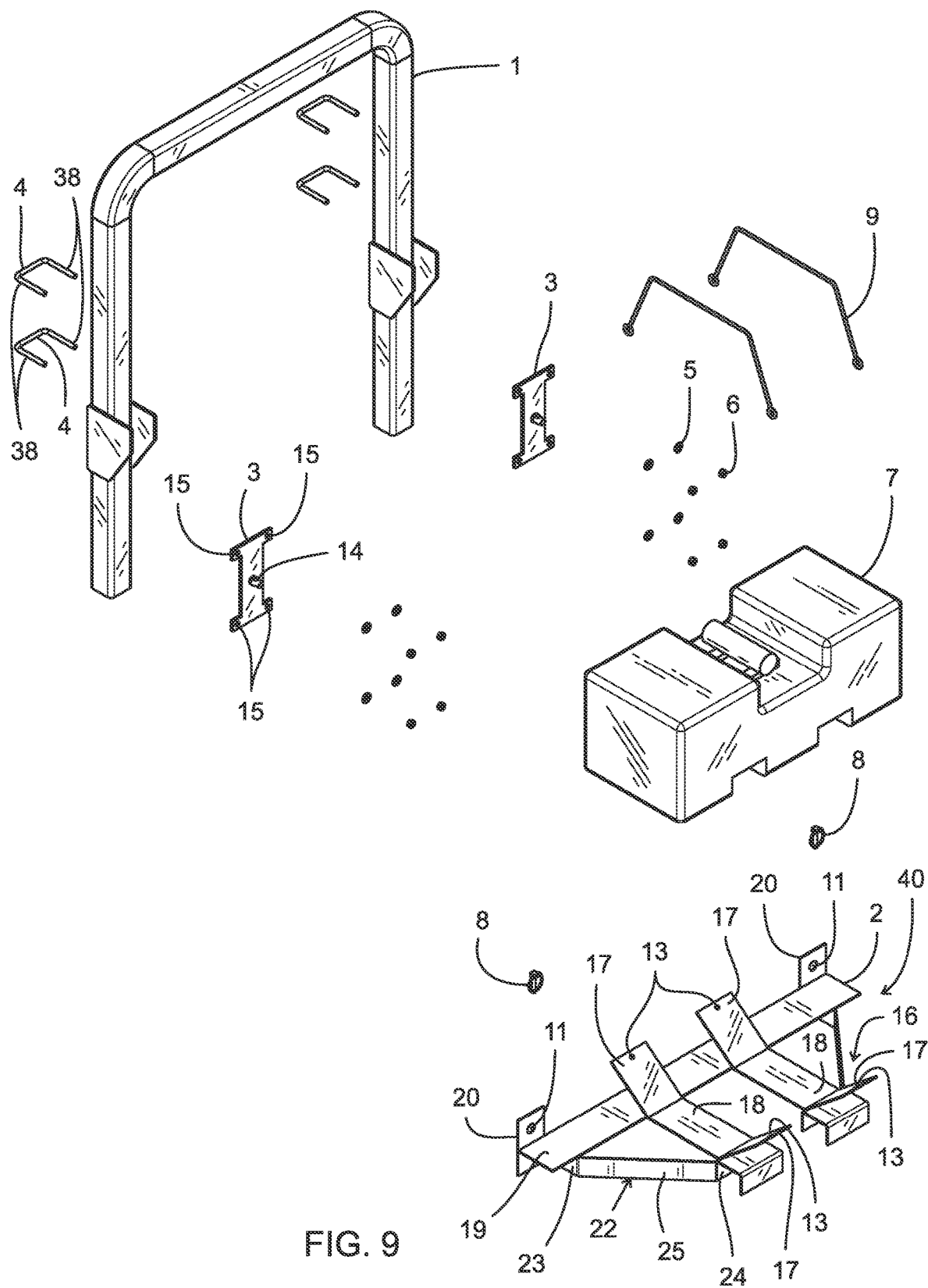
FIG. 9 is an exploded view of the second preferred embodiment of a frame or rack of the present invention as shown in FIG. 7.

FIGS. 7-9 show a second preferred embodiment of the apparatus of the present invention designated generally by the numeral 40, in which a support frame or rack 40 can be removably attached to a roll bar 1, 70, 111 of a wheeled vehicle 30, 53 in an elevated/upright position.

FIGS. 10-15 show a third preferred embodiment of sprayer rack 50 including a support or stop 65, which can be used with a wheeled lawn care apparatus 30 of the type having a roll bar 70 that preferably does not include a stop.

FIGS. 16 to 19 show a fourth preferred embodiment of the apparatus of the present invention designated generally by the numeral 80, in which a support frame or rack 80 can be removably attached to a roll bar 1, 70, 111 of a wheeled vehicle 30, 53 in an elevated/upright position. Support frame or rack 80 is a universal rack adapted for coupling to roll bars of different sizes or dimensions.

FIGS. 20 to 23 show a fifth preferred embodiment of the apparatus of the present invention designated generally by the numeral 100, in which a support frame or rack 100 can be removably attached to a roll bar 1, 70 of a wheeled vehicle 30 in a retracted/lowered position. Support frame or rack 100 is a universal rack adapted for coupling to roll bars of different sizes or dimensions.

FIGS. 24-28 show a sixth preferred embodiment of a support frame or rack 110 which can be coupled to a roll bar 111 having a pin 114 fixedly coupled thereto, e.g., welded, to a roll bar 111. This embodiment may be desired on a wheeled lawn care apparatus 53 of the type with a roll bar that cannot be lowered, but can also potentially be used with a roll bar that can be lowered/retracted when the roll bar is not lowered/retracted.

Figure 29:
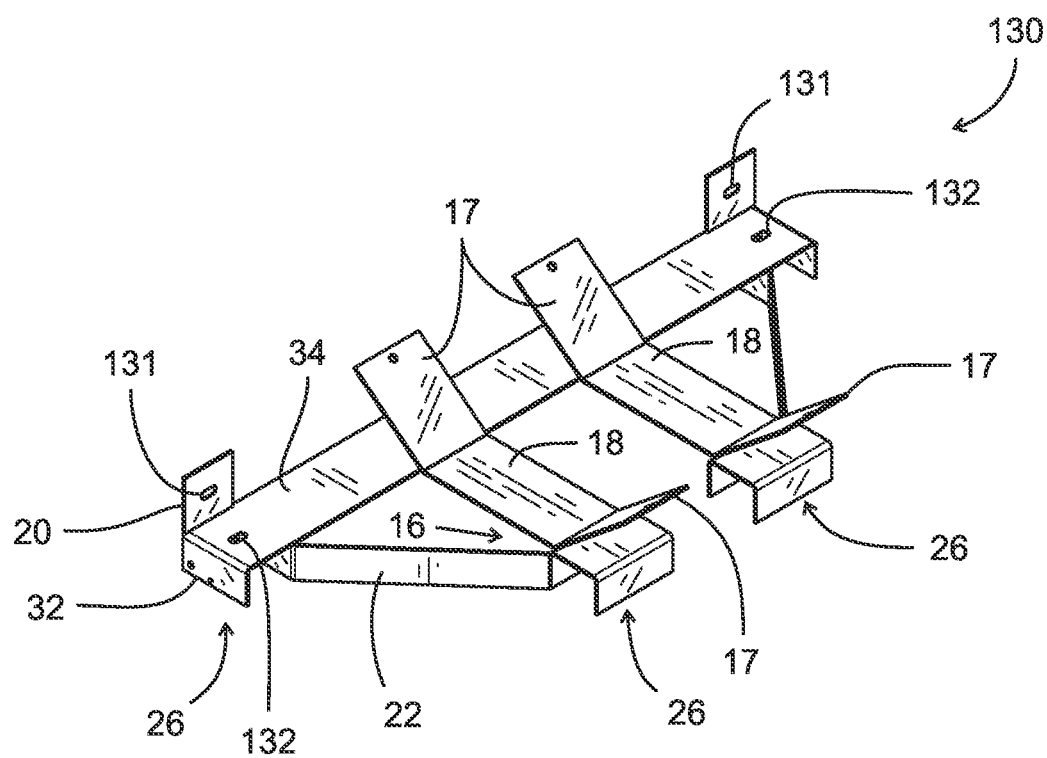
FIG. 29 is a perspective view of a seventh preferred embodiment of a sprayer support frame of the present invention.

FIG. 29 shows a seventh preferred embodiment of the apparatus of the present invention designated generally by the numeral 130, in which a support frame or rack 130 can be removably attached to a roll bar 1, 70, 111 of a wheeled vehicle 30 or 53 in a raised/upright position or to a roll bar 1, 70 of a wheeled vehicle 30 in retracted/lowered position. This is an alternative embodiment of support frame or rack 10, that is a universal rack adapted for coupling to roll bars of different sizes or dimensions. A stop 65 can also be used with this embodiment if desired.

Figure 30:
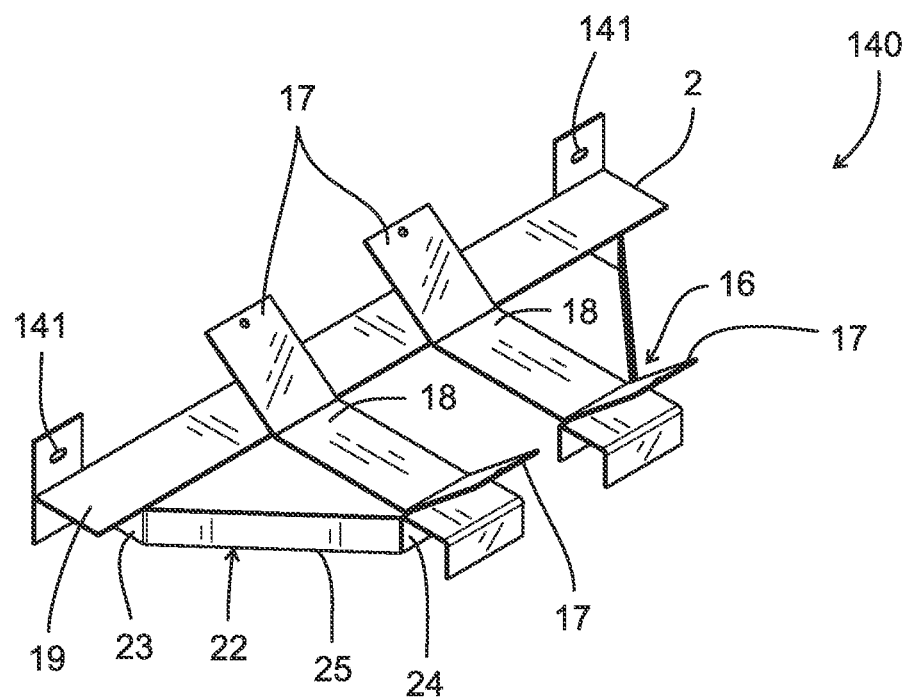
FIG. 30 is a perspective view of an eight preferred embodiment of a sprayer support frame of the present invention.

FIG. 30 shows an eighth preferred embodiment of the apparatus of the present invention designated generally by the numeral 140. A support frame or rack 140 can be removably attached to a roll bar 1, 70, 111 of a wheeled vehicle 30, 53 in a raised/upright position. This is an alternative embodiment of support frame or rack 40, that is a universal rack adapted for coupling to roll bars of different sizes or dimensions.

Figure 1:
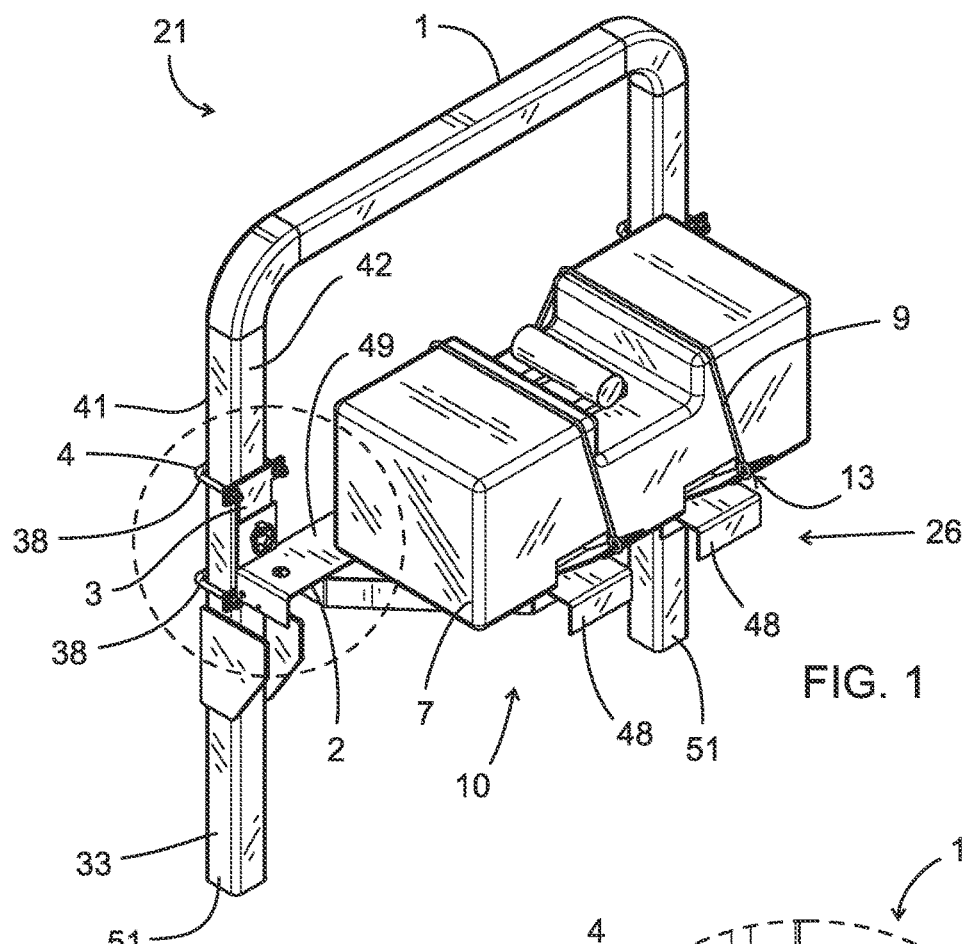
FIG. 1 is a perspective view of a first preferred embodiment of a frame or rack of the present invention coupled to a rollover protective structure of a lawn mower or tractor in an extended or up position.
Figure 2:
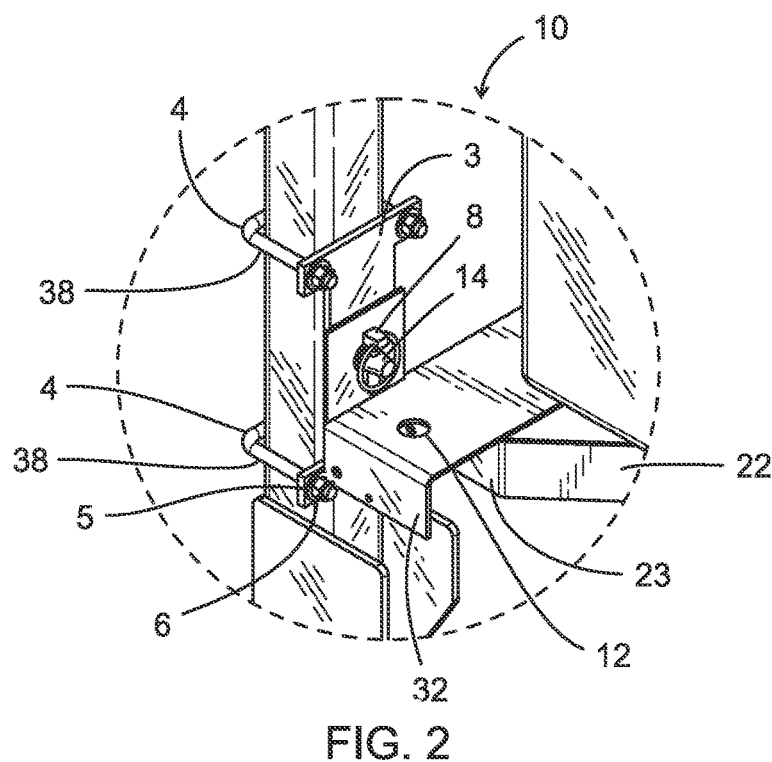
FIG. 2 is a detail view including a preferred embodiment of a connector plate or roll bar mount of a preferred embodiment of the present invention as shown in FIG. 1.
Figure 3:
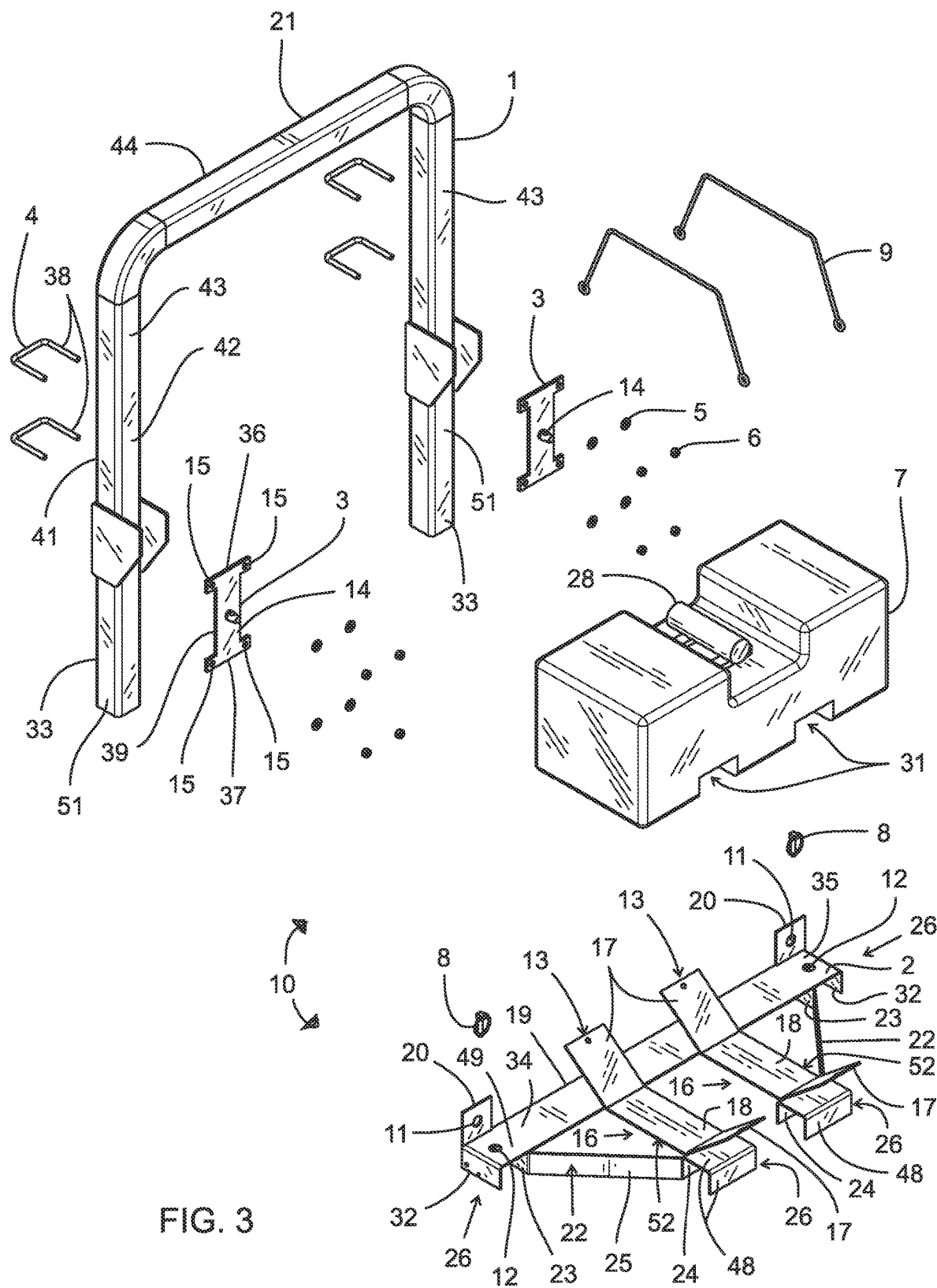
FIG. 3 is an exploded view of a preferred embodiment of a frame or rack of the present invention as shown in FIG. 1.
Figure 4:
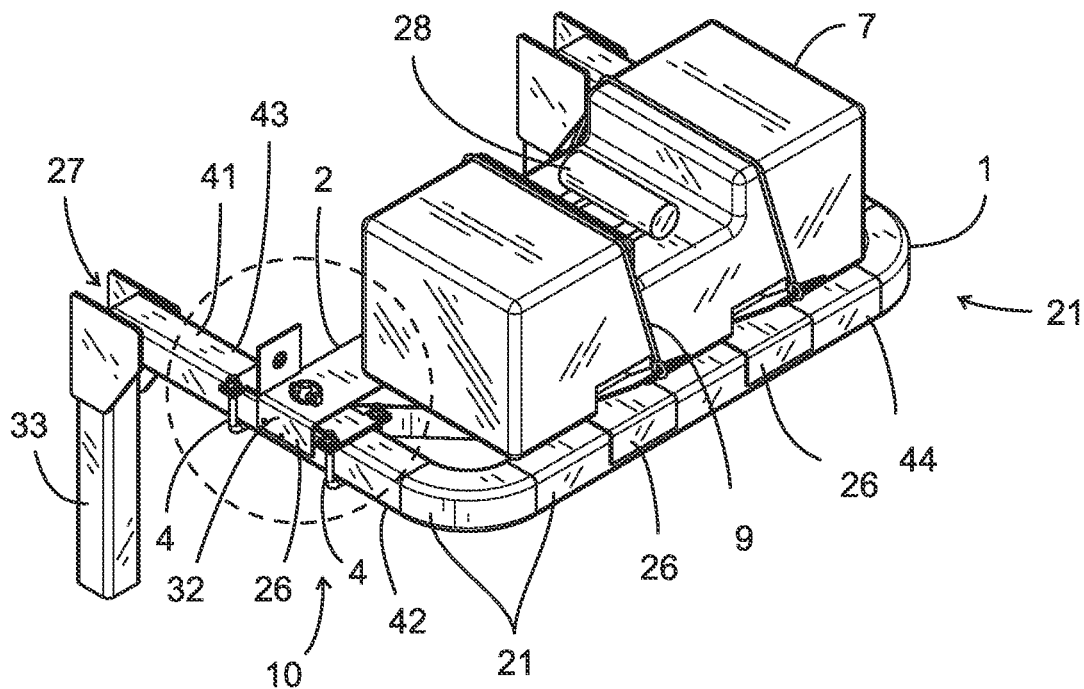
FIG. 4 is a perspective view of a preferred embodiment of frame or rack of the present invention coupled to a rollover protective structure of a lawn mower or tractor in a retracted or down position.
Figure 5:
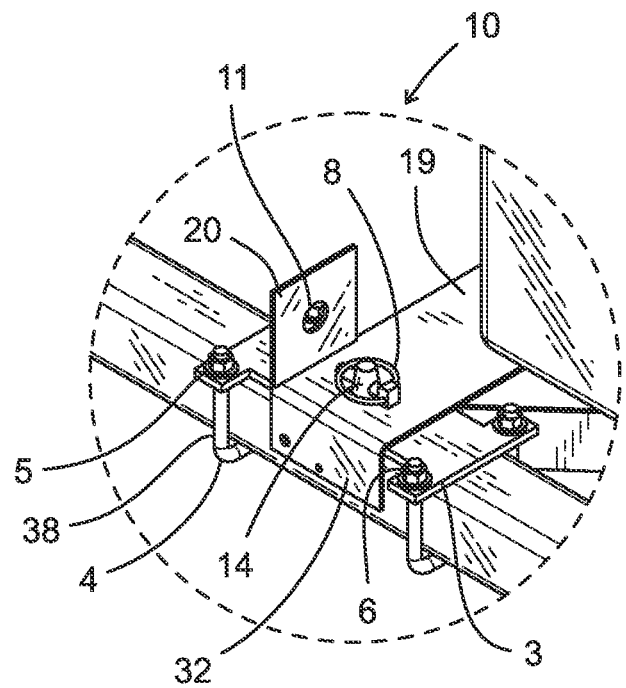
FIG. 5 is a detail view including a preferred embodiment of a connector plate or roll bar mount of a preferred embodiment of the present invention as shown in FIG. 4.
Figure 6:
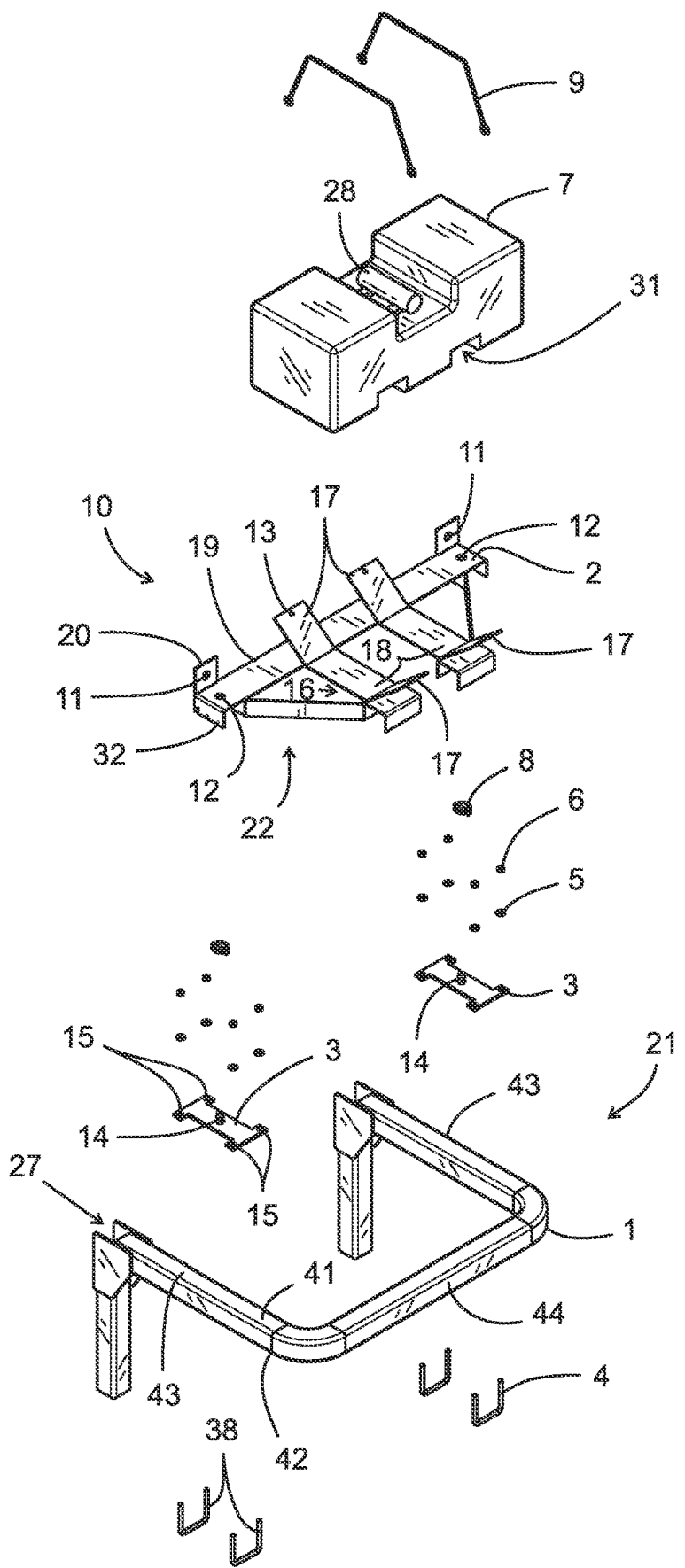
FIG. 6 is an exploded view of a preferred embodiment of a frame or rack of the present invention as shown in FIG. 4.

Referring to FIGS. 1-6, a first preferred embodiment of a support frame or rack 10 is shown. Support frame or rack 10 preferably can be selectively coupled or attached to a rollover protective bar (roll bar) 1 of a lawn mower, a tractor, or other wheeled lawn care apparatus 30 ¥17" while roll bar 1 is upright, raised, or elevated, e.g., as shown in FIGS. 1-3, or while roll bar 1 is lowered or retracted, e.g., as shown in FIGS. 4-6.

A roll bar 1 of a lawn mower, tractor, or wheeled lawn care apparatus 30 of the type sold under the brand names of John Deere®, Kubota®, HUSQUARNA®, Kawasaki®, Big Dog®, Snapper®, Yard Machine®, Simplicity®, and Echo® can have a lower, longitudinal bar portion 33 that is typically fixed to the vehicle 30 chassis 55 and not moveable, and have an upper, transverse bar portion 21 that can be moved between an elevated/upright position and a lowered/retracted position, wherein in the lowered/retracted position the transverse bar portion 21 is positioned at about a 70-100 degree angle (e.g., 90 degree angle) respective to the immovable longitudinal lower bar portion 33, which can be a pair of immovable longitudinal legs or side portions 51. In these lawn mowers or tractors 30, a stop can already be included with a roll bar 1 that prevents roll bar 1 from moving to a position beyond at or about a 90 degree angle respective to immovable longitudinal lower bar portion 33 to hold transverse bar portion 21 in a horizontal position, or in a position that is at least substantially horizontal. A transverse bar portion 21 can have a u-shape with two longitudinal supports or legs 43 and a center/lateral portion 44. Specific examples of wheeled lawn care vehicles 30 are the commercially available Kubota 2D1011 zero turn lawn mower and the Kubota BX2380 tractor.

Other lawn mowers, tractors, or wheeled lawn care vehicles 30 e.g., of the type sold under the brand name Simplicity®, can have a roll bar 70 with a transverse bar portion 21 moveable to an angle other than 90 degrees, e.g., movable to an angle past 90 degrees respective to an immovable lower longitudinal bar portion 33, which generally can include a pair of longitudinal legs or sides 51. In these lawn mowers or tractors 30, a stop is not included or utilized that prevents the roll bar 70 from moving to a position beyond a 90 degree angle respective to immovable lower longitudinal bar portion 33 so that transverse bar portion 21 is not in a horizontal position, or not in a position that is at least substantially horizontal, when in a fully lowered or retracted position.

The upper portion 21 of a roll bar 70 of some lawn mowers or tractors can be lowered or retracted to one or more different selected levels or angles.

Preferably a support frame or rack 10 is positioned on a roll bar 1 in a lowered position when a transverse bar portion 21 of roll bar 1 is at or near a 90 degree angle respective to immovable longitudinal lower bar portion 33, e.g., when used with a wheeled lawn care vehicle 30, e.g., a lawn mower or tractor that has a stop included in the roll bar portion to prevent the roll bar from moving beyond a 90 degree angle respective to immovable longitudinal lower bar portion 33 or beyond an at least substantially horizontal position. As discussed further below, a support frame or rack 50 can also preferably be used with a roll bar 70 in a lowered position when a transverse bar portion 21 of roll bar 70 is retractable to an angle other than 90 degrees, or beyond 90 degrees respective to immovable longitudinal lower bar portion 33. In this embodiment, a support or stop 65, which can be a diagonal support, is included with support frame or rack 50 and functions as a stop to prevent movement of roll bar 70 transverse bar portion 21 beyond a desired position, e.g., beyond a horizontal position, or beyond an at least substantially horizontal position, respective to immovable longitudinal lower bar portion 33 and can maintain transverse bar portion 21 at or about at an angle of 70 to 100 degrees (e.g., preferably at or about 90 degrees), respective to immovable longitudinal lower bar portion 33. (see e.g., FIGS. 10-15 showing a third preferred embodiment of sprayer rack 50 including a support or stop 65, which can be used with this type of roll bar).

Support frame or rack 10 preferably includes a mounting frame portion/tank frame 2 having a lateral mounting plate/lateral plate 19 having a first end 34 and a second end 35 and having a first opening 12 positioned on first end 34 and a second opening 12 positioned on second end 35. Support frame or rack 10 mounting frame portion 2 also includes a first longitudinal mounting plate 20 having an opening 11 and a second longitudinal mounting plate 20 having an opening 11, wherein the first longitudinal mounting plate 20 is coupled to the lateral mounting plate 19 at first end 34 and the second longitudinal mounting plate 20 is coupled to the lateral mounting plate 19 at second end 35. The longitudinal mounting plates 20 can be connected to lateral mounting plate 19, for example, via welding or u-bolted.

Support frame 10 also includes a rack portion 16 with two spaced apart saddles 52, wherein a saddle has a cross beam 18 and a pair of side walls 17. Each sidewall 17 preferably extends upward from a cross beam 18 at an angle, e.g., an angle over 90 degrees respective to a lateral axis of cross beam 18. Preferably rack portion 16 including saddles 52 is sized to receive a sprayer tank 7 that can rest on cross beams 18 between side walls 17 of a saddle 52. In some preferred embodiments, cross beams 18 can be sized to fit within a recess 31 on a bottom portion of a sprayer tank 7. Cross beams 18 can support the weight of a sprayer tank 7 placed thereon and hold sprayer tank 7 in between side walls 17. Each side wall 17 can have one or more openings 13, preferably sized to receive a strap or cord or bungee strap 9 therethrough, which can be used to help secure a tank 7 on rack portion 16 of support frame 10. Rack portion 16 can be coupled (e.g., welded, u-bolted) to lateral mounting plate 19, e.g., at or near a junction of each cross beam 18 and a sidewall 17 as shown. Or, a cross beam 18 can be coupled to rack 10, e.g., in a position where a portion of cross beam 18 rest on lateral mounting plate 19.

Support frame or rack 10 can also have a pair of opposing side beams or diagonal plates 22, each having a center portion 25, a first sidewall portion 23 and a second sidewall portion 24, wherein the center portion 25 of each of the pair of opposing side beams 22 preferably extends from a side plate 23 under lateral mounting plate 19 to rack portion 16 at an obtuse angle respective to a lateral axis of side plate 23. With respect to a lateral axis of lateral mounting plate 19, center portion 25 can preferably be at an acute angle. First side wall portion 23 can extend from center portion 25 at an obtuse angle respective to a lateral axis of center portion 25 and under lateral mounting plate 19. Second side wall portion 24 can extend from center portion 25 at an obtuse angle respective a lateral axis of center portion 25 and under rack portion 16, e.g., at a junction of cross beam 18 and a sidewall 17 that is spaced away from lateral mounting plate 19.

Support frame or rack 10 can also have one or more flanged connectors 26 having a substantially u-shape and sized to rest on a transverse bar portion 21 of roll bar 1 and partially around transverse bar portion 21, e.g., as shown in FIG. 4. A first sidewall portion 23 of a side beam 22 can form one side of a flanged connector 26 that can be positioned along or at least partially around a leg or longitudinal supports 43 of transverse bar portion 21. An end plate 32 can form the other side of a said flanged connector 26 positionable on leg 43 of transverse bar portion 21. A central portion 49 of such a flanged connector 26 that can be positioned on a leg 43 of transverse bar portion 21 can be formed by a portion of lateral mounting plate 19. End plates 32 can be coupled to lateral mounting plate 19, e.g., welded or u-bolted.

A second sidewall portion 24 of each side beam 22 can form one side of another flanged connector 26 that can rest along or at least partially around center lateral portion 44 of transverse bar portion 21. An L-shaped plate 48 as shown can form the other side and central portion of such a flanged connector 26 under rack portion 16 and that can rest on center/lateral portion 44 of transverse bar portion 21. A plate 48 can be coupled to rack portion 16 and/or a side portion 24, e.g., welded or u-bolted, at or near a junction of cross beam 18 and a side wall 17 that is spaced away from lateral mounting plate 19.

As shown in the figures, four flanged connectors 26 can be included to help secure a frame 10 in position on a roll bar 1. Less or more flanged connectors can be included if desired. A flanged connector 26 also does not need to be included to support a sprayer tank 7 as described herein, e.g., if a support frame 80 or 100 as shown in FIGS. 16-23 is used.

When support frame or rack 10 is positioned on a roll bar in an extended or raised position, flanged connectors 26 are not positioned on a roll bar 1 as shown in FIG. 1. When support frame or rack 10 is positioned in a lowered or retracted position as shown in FIG. 4, flanged connectors 26 can rest on and partially around transverse bar portion 21 of roll bar 1.

A pair of connector plates or roll bar mounts 3 are adapted to connect a support frame 10 to roll bar 1 when roll bar 1 is raised/extended/upright or when roll bar 1 is lowered/retracted. A connector plate 3 preferably has a fastener 14, e.g., a pin or bolt, which can be positioned about centrally on each connector plate 3. Fastener 14 can be fixedly connected, e.g., welded, or non-fixedly connected, e.g., with a threaded bolt or pin connection, to connector plate 3. A connector plate 3 can have a substantially "I" shape, as shown in the figures, with an upper connector plate transverse end 36 and a lower connector plate transverse end 37, with the upper connector plate transverse end 36 having a pair of openings 15 and the lower connector plate transverse end 37 having a pair of openings 15. Each pair of openings 15 preferably is adapted to receive a leg 38 of a fastener 4, e.g., a u-bolt.

When connector plate 3 has an "I" shape, upper connector plate transverse end 36 can be the upper transverse portion of the "I" shape of connector plate 3, and lower connector plate transverse end 37 can be the lower transverse portion of the "I" shape of connector plate 3. Fastener 14 can be positioned on a longitudinal member 39 of the "I" shape of connector plate 3. Alternatively, a connector plate 3 can have another desired shape, e.g., rectangular or square.

Referring to FIGS. 1-5, transverse bar portion 21 of roll bar 1 has two longitudinal supports or legs 43 and a center/lateral portion 44. When roll bar 1 is in a raised/extended position, connector plate 3 can be selectively connected to roll bar 1 transverse bar portion 21 above hinge 27 on a longitudinal support or leg 43, wherein two fasteners or u-bolts 4 can be positioned on a forward side 41 and partially around transverse bar portion 1 so that legs 38 of u-bolts 4 extend through openings 15 on upper connector plate transverse end 36 and lower connector plate transverse end 37 when connector plate 3 is positioned on a rear or back side 42 of transverse bar portion 21. In this position, legs of U-bolts 4 extend laterally, and preferably ¥215 horizontally or at least substantially horizontally through openings 15 of connector plate 3.

Fastener 14 of connector plate 3 can be positioned through an opening 11 on a first or second longitudinal mounting plate 20 of support frame 10 and secured within opening 11, with fastener 14 extending laterally or at least substantially horizontally through opening 11. As mentioned, fastener 14 can be a locking pin as shown in the figures, or could be another type of fastener, e.g., a threaded bolt and washer.

Connector plate 3 and support frame 10 can also selectively be coupled to roll bar 1 when roll bar 1 transverse bar portion 21 is in a lowered or retracted position as shown in FIGS. 4-6. In FIGS. 4-6, roll bar 1 transverse bar portion 21 is retracted or lowered to an angle of about 90 degrees, respective to immovable longitudinal lower bar portion 33, at or about a hinge 27. A roll bar on some tractors can also be retracted after removing a locking pin, for example on movable roll bars that do not have a hinge.

Fasteners or u-bolts 4 can be positioned under transverse bar portion 21 longitudinal supports or legs 43 (which is on a rear or back side 42 of transverse bar portion 21) and the pair of connector plates 3 can be positioned on forward side 41 of each transverse bar portion longitudinal support or leg 43. Two fasteners or u-bolts 4 preferably are used to couple each connector plate 3 to roll bar 1. Each legs 38 of each fastener or u-bolt 4 can extend through an opening 15 of a connector plate 3, with legs 38 oriented longitudinally or at least substantially vertically through openings 15. A fastener 14 of a connector plate 3 can extend through an opening 12 on lateral mounting plate 19, with fastener 14 oriented longitudinally or at least substantially vertically. As mentioned, fastener 14 can be a locking pin that can secure frame 10 to connector plate 3, or can be another type of fastener, e.g., a threaded bolt and washer.

Referring to FIGS. 7-9, a second preferred embodiment of a sprayer support frame or rack 40 is shown. In this embodiment, support frame or rack 40 is adapted to be coupled to a roll bar 1 or 70 only when roll bar 1 is in an extended or upright position. This embodiment may also be preferred for use with a wheeled lawn care apparatus, tractor or lawn mower 53 having a roll bar 111 that cannot be retracted or lowered. A wheeled lawn care apparatus 53 can be of the type having a one or more wheels 54, a chassis 55, an operator's seat 56, an engine 57 (not shown), and a steering device 58. Support frame 40 can be the same or at least substantially similar to a support frame 10 except it does not need to include openings 12 on lateral mounting plate 19. An end plate 47 can also be included, if desired that is substantially triangular or another desired shape, instead of end plate 32 which can be substantially rectangular, if desired. Alternatively, an end plate 47 or 32 can also be eliminated in this embodiment if desired. A support frame or rack 40 can also be used with a roll bar 1 or 70 of a wheeled vehicle 30, if desired, when the roll bar 1 or 70 is extended/upright.

A connector plate 3 can connect support frame 40 to a roll bar 1 transverse bar portion 21 with a fastener 14 positioned through an opening 11 of a longitudinal mounting plate 20 in a same or similar manner as described with regard to FIGS. 1-3. Some flanged connectors 26 are included in the embodiment of FIGS. 7-9 as shown, but a frame 40 alternatively can be made without flanged connectors 26, if desired.

Referring to FIGS. 10-15, a third preferred embodiment of a sprayer support frame of the present invention, designated generally by the numeral 50, is shown. A sprayer support frame 50 can be the same or similar to a sprayer support frame 10 and includes a stop 65. A sprayer support frame 50 preferably is used or included with a lawn mower, tractor, or wheeled lawn care apparatus 30, that has a roll bar 70 with a transverse bar portion 21 moveable to an angle other than 90 degrees, e.g., movable to an angle past 90 degrees respective to immovable longitudinal lower bar portion 33. In these lawn mowers or tractors 30, a stop typically is not included in a roll bar 70 that prevents roll bar 70 from moving to a position beyond a 90 degree angle respective to a longitudinal axis of immovable longitudinal lower bar portion 33 so that transverse bar portion 21 is not in a horizontal position, or not in a position that is at least substantially horizontal, when roll bar 1 is in a lowered or retracted position.

A preferred embodiment of a sprayer support frame 50 can include a mounting frame portion/tank frame 2, e.g., as shown and described with regard to a sprayer support frame 10 in FIGS. 1-6 that is attachable to a roll bar 1 in either a longitudinal/upright position or in a lowered/retracted position, e.g., in a similar manner as described with regard to support frame 10. A preferred embodiment of a sprayer support frame 50 as shown in FIGS. 10-15 additionally includes a roll bar support or stop 65, which can be a diagonal support, that can function as a stop to prevent movement of transverse bar portion 21 of a roll bar 1 beyond a desired position, e.g., to prevent movement of roll bar 1 beyond a horizontal position or beyond an at least substantially horizontal position respective to immovable longitudinal lower bar portion 33, to hold roll bar 1 at a 90 degree angle, or at an at least substantially 90 degree angle respective to immovable longitudinal lower bar portion 33, when transverse bar portion 21 is in a lowered or retracted position.

Roll bar support or stop 65 preferably includes a flanged portion 60 for mounting to a leg or longitudinal support 75 of immovable longitudinal lower bar portion 33 of roll bar 1, a cross beam 61, and a flanged portion 62 that can receive transverse bar portion 21 of roll bar 1. Cross beam 61 preferably diagonally extends between flanged portion 60 and flanged portion 62, e.g. at and upward angle, e.g., preferably at an angle between 10 to 45 degrees. Cross beam 61 can also be positioned at an angle between 0 and 90 degrees between flanged portion 60 and flanged portion 62. Flanged portion 60 can have a substantially u-shape with a center portion/side plate 72 and two sides 73. Flanged portion 62 can have a substantially u-shape with a center portion/bottom plate 63 and two sides 71.

Figure 14:
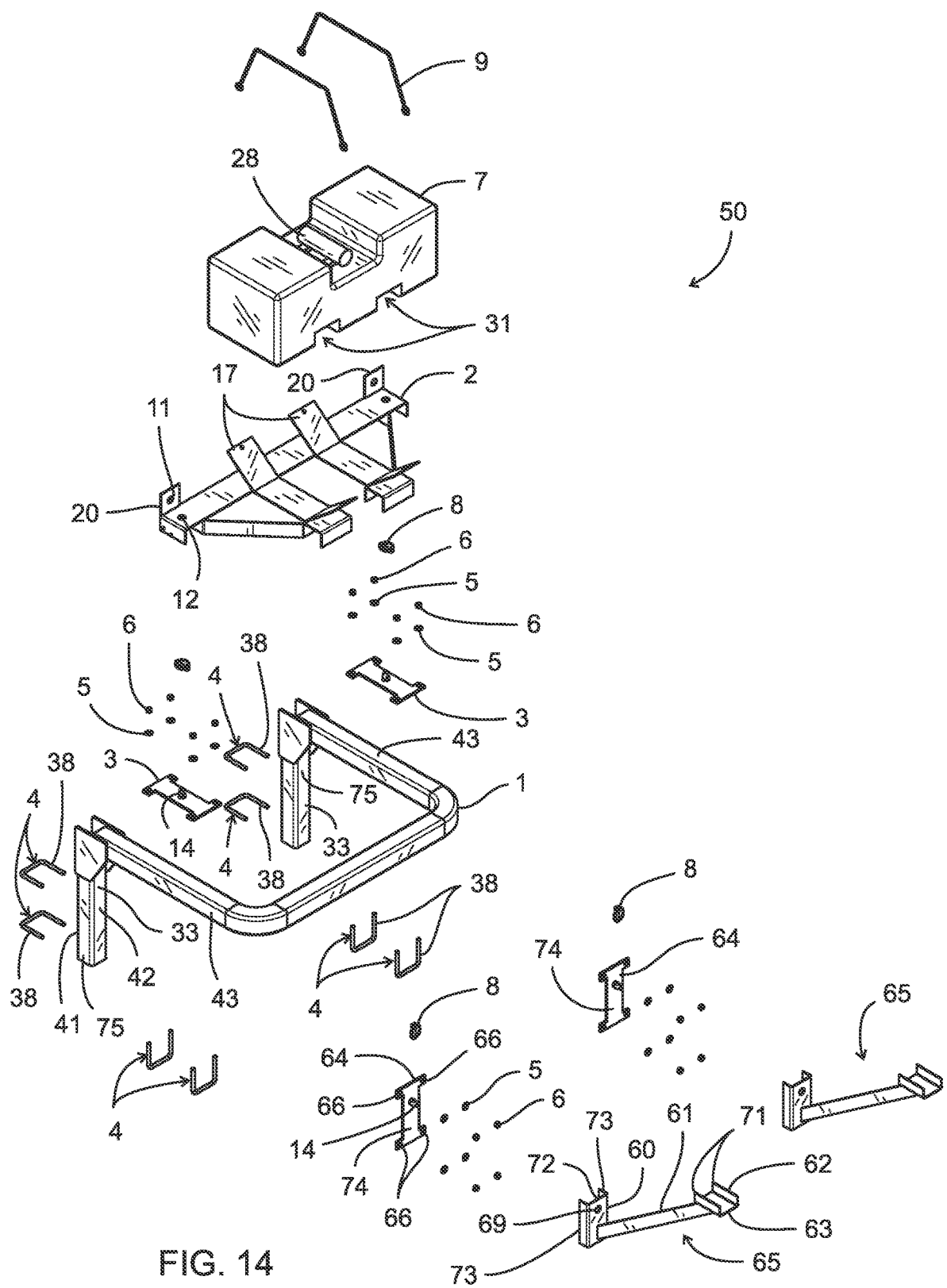
FIG. 14 is an exploded view of a third preferred embodiment of a sprayer support frame of the present invention.
Figure 15:
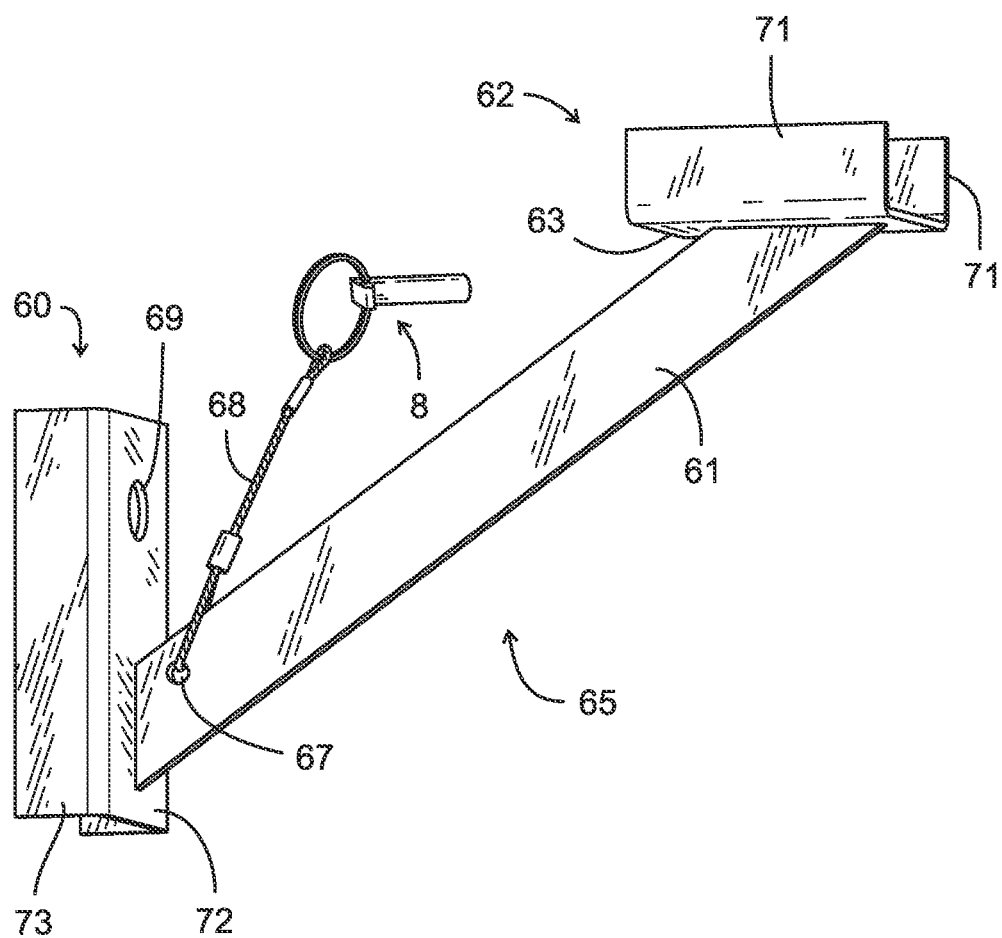
FIG. 15 is a perspective view illustrating a roll bar diagonal support of a third preferred embodiment of a sprayer support frame of the present invention.
Figure 16:
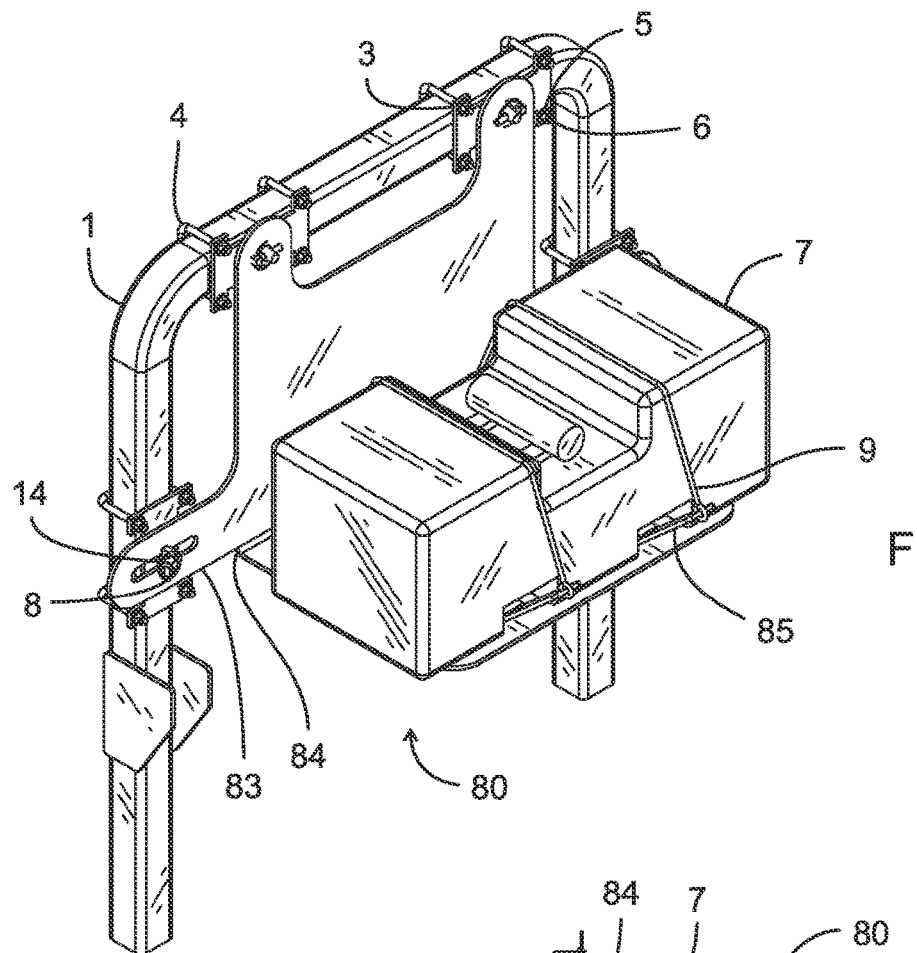
FIG. 16 is a perspective view of a fourth preferred embodiment of a sprayer support frame of the present invention.
Figure 17:
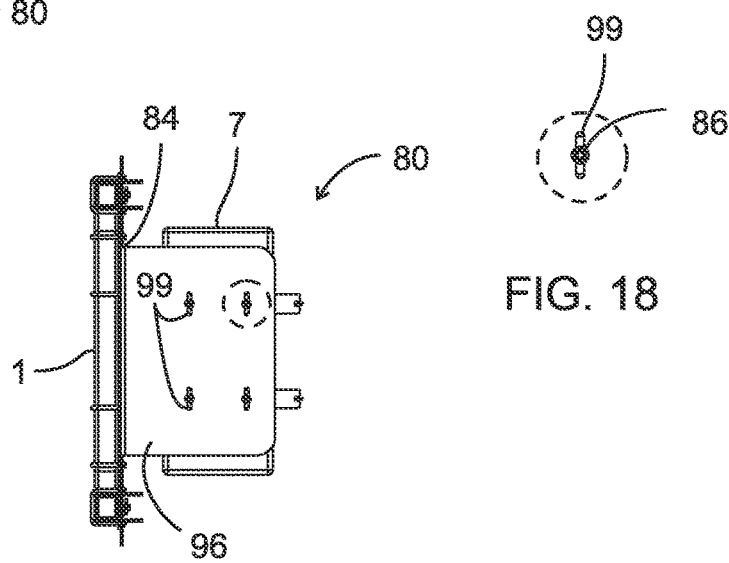
FIG. 17 is a bottom view of the fourth preferred embodiment of the present invention.
Figure 18:
FIG. 18 is a partial detail view of the fourth preferred embodiment of the present invention.
Figure 19:
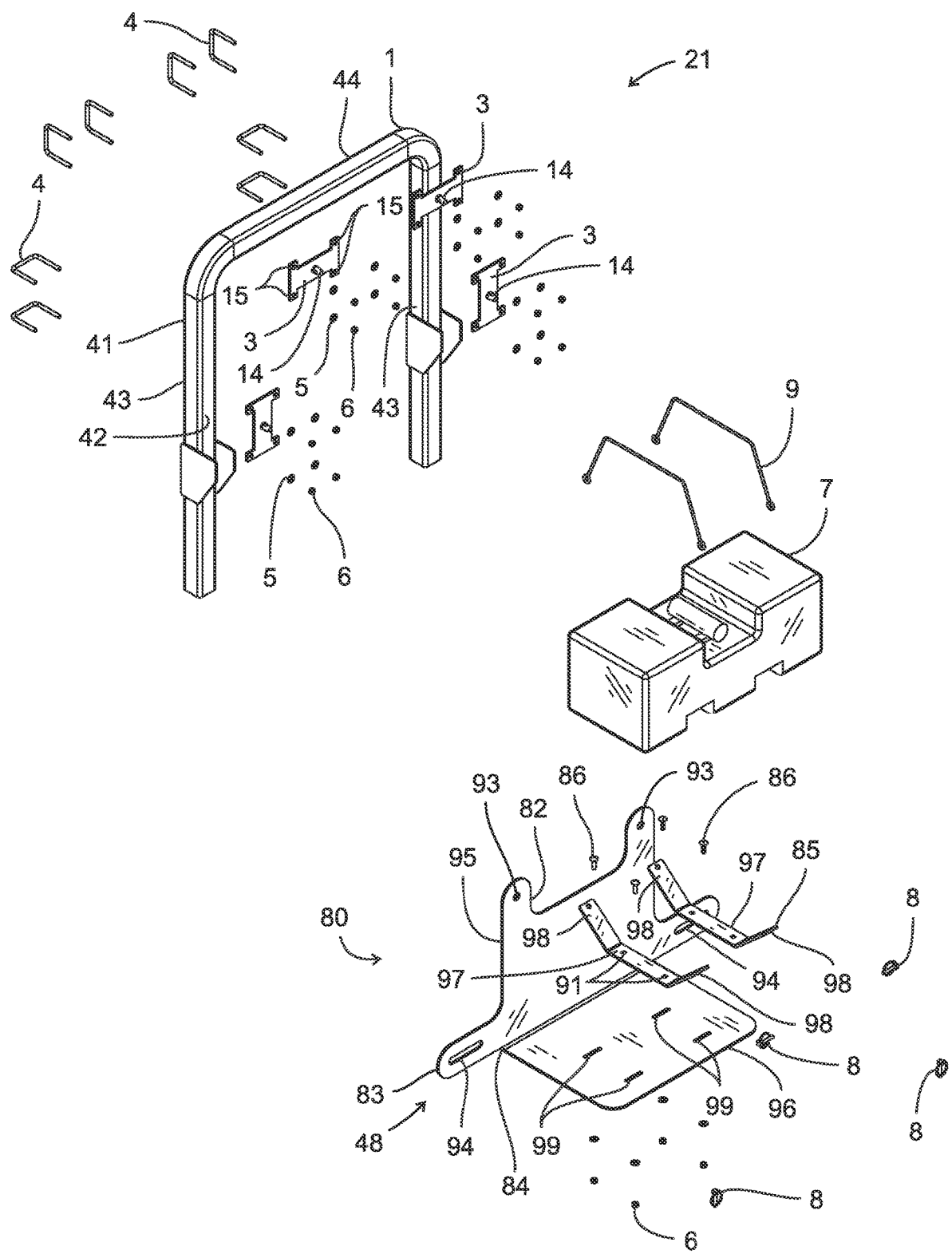
FIG. 19 is an exploded view of the fourth preferred embodiment of the present invention.
Figure 23:
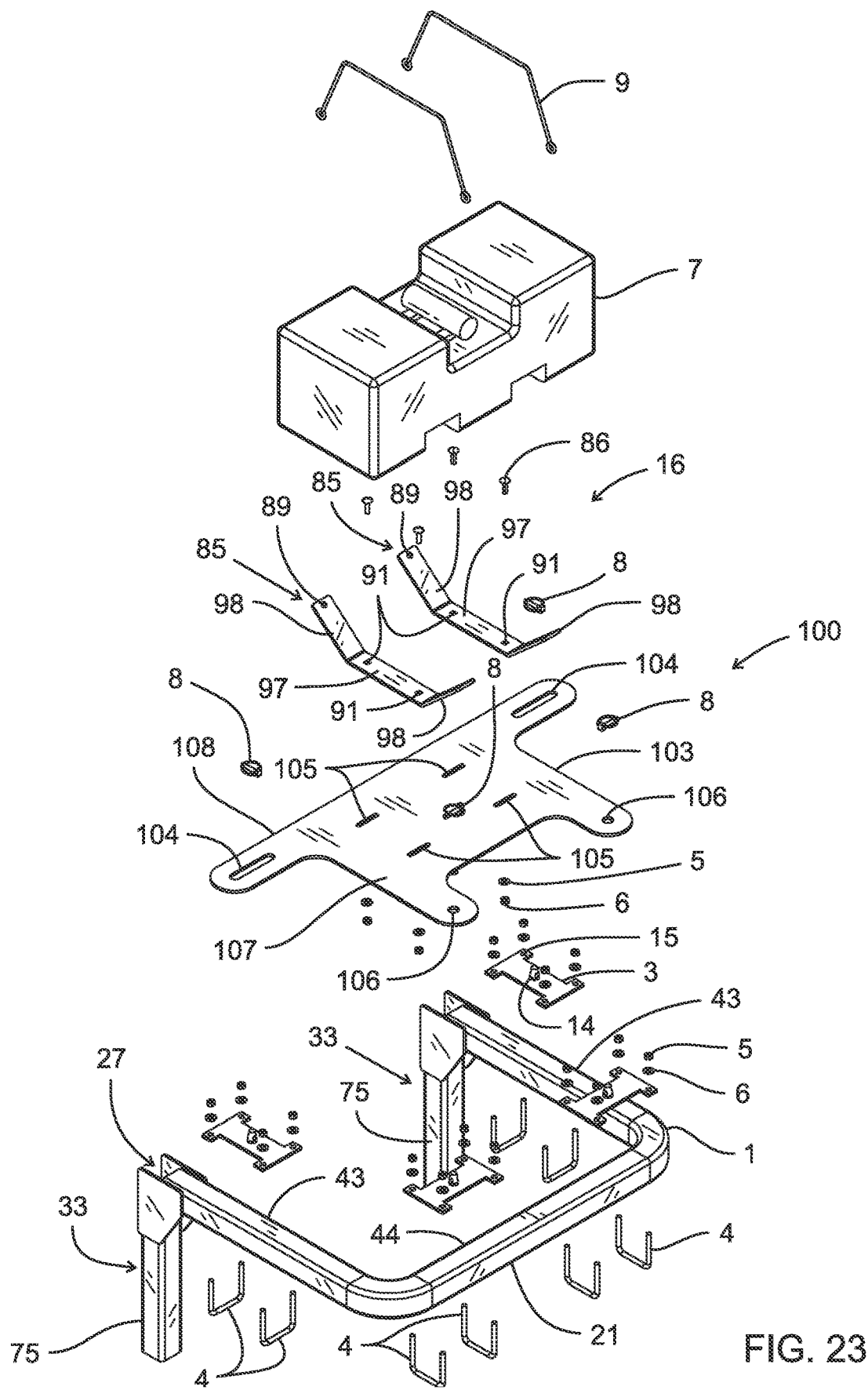
FIG. 23 is an exploded view of the fifth preferred embodiment of the present invention.

As shown in exploded view in FIG. 14, a connector plate 64 including openings 66, and a fastener 14, e.g., a pin or bolt, can be used to couple flanged portion 60 of roll bar support or stop 65 to immovable longitudinal lower bar portion 33 using a fastener 8, e.g., a locking pin, and fasteners 4, e.g., u-bolts. A connector plate 64 as shown is similar to a connector plate 3, except fastener 14 is not positioned substantially centrally on plate 64. The position of a fastener 14 is preferably chosen to align with opening 69 on flanged portion 60 of support or stop 65. Connector plate 64 can be coupled and secured to flanged portion 60 when fastener 14 is positioned through opening 69 and secured therein with a fastener or locking pin 8. As shown in FIG. 15, when fastener 14 is a locking pin with ring portion 8, it can include a cord or tie 68 positioned through an opening 67 on cross beam 61 of support or stop 65.

Flanged portion 60 preferably is shaped to fit at least partially around a leg or longitudinal support 75 of immovable longitudinal lower bar portion 33 of roll bar 1 and has a center portion/side plate 72 and a pair of sides 73. Connector plate 64 center plate 74 can be positioned on a back side 42 of a leg or longitudinal support 75 of longitudinal bar portion 33. The position of connector plate 64 on a leg or longitudinal support 75 of immovable longitudinal lower bar portion 33 can be selected based on the angle of cross beam 61 so that when support or stop 65 is coupled to roll bar 1, the transverse bar portion 21 of roll bar 1 is held horizontally or at least substantially horizontally in position relative to a longitudinal axis of a leg or longitudinal support 75 of immovable longitudinal lower bar portion 33.

Preferably, transverse bar portion 21 will rest within flanged portion 62, which can wrap at least partially around transverse bar portion 21, e.g., at a leg or longitudinal support 43 as shown in the figures. Flanged portion 62 can have a bottom plate or center portion 63 and pair of sides 71. When transverse bar portion 21 rests at least substantially levelly or flush on a bottom plate or center portion 63 between sides 71 of flanged portion 62, this is an indication ¥24~ that connector plate 64 is in a preferred desired position on immovable longitudinal lower bar portion 33 such that transverse bar portion 21, in a desired retracted or lowered position, will be positioned at least substantially horizontally respective to immovable longitudinal lower bar portion 33 when support or stop 65 is coupled and secured to immovable longitudinal lower bar portion 33.

After connector plate 64 is positioned on a back side 42 of a leg or longitudinal support 75 of immovable longitudinal lower bar portion 33, flanged portion 60 of support or stop 65 can be coupled to connector plate 64 and a leg or longitudinal support 75 of immovable longitudinal lower bar portion 33 by positioning fastener 14 of connector plate 64 through opening 69 of flanged portion 60 and positioning fasteners 4, e.g., a pair of u-bolts, along a forward side 41 of a leg or longitudinal support 75 of immovable longitudinal lower bar portion 33 so that legs 38 of fastener 4 can be positioned through openings 66 of connector plate 64 which is along the back side 42 of immovable longitudinal lower bar portion 33. A leg 38 of a fastener 4 can be secured in an opening 66 using fasteners 5, 6, e.g., a washer and nut. As discussed, a fastener 14 can be a locking pin with a locking ring 8 that can be used for coupling within opening 69, as shown in FIG. 14

FIGS. 16 to 19 show a fourth preferred embodiment of the apparatus of the present invention designated generally by the numeral 80. A support frame or rack 80 can be removably attached to a roll bar 1 or 70 of a wheeled lawn care vehicle 30, for example, in an elevated/upright position as shown in the figures. A support frame or rack 80 can also be used with a wheeled lawn care vehicle 53, for example, that has an immovable roll bar 111.

Support frame or rack 80 is a universal rack adapted for coupling to roll bars of different sizes or dimensions. The width between legs/longitudinal supports 43 of roll bar transverse portion 21, for example can be vary based on a particular roll bar 1 or 70 of a particular wheeled lawn care apparatus 30 or 53. For example, for roll bars 1 or 70 of different brands and sizes of lawn mowers, the width between legs/longitudinal supports 43 of a roll bar transverse portion 21 of a roll bar 1, 70 or 111, for example, can vary typically about ¼ inch to 1 inch. For roll bars 1, 70, 111 of different brands and sizes of tractors, the width between legs/longitudinal supports 43 of a roll bar transverse portion 21 can vary typically about 6 to 8 inches. Openings 94 of a support frame or rack 80 are preferably adapted to compensate for these variations of different roll bars so that a support frame or rack 80 can be attached to any roll bar 1, 70 or 111 on any given wheeled lawn care apparatus 30, 53. Openings 94 most preferably are slotted having a length of at least between about ¼ to 8 inches. Openings 94 can also be slotted having a desired length of between more than 0 inches to 10 inches, or other desired length.

Support frame or rack 80 can have an "L" shape with a longitudinal plate or back portion 95 and a lateral plate or bottom portion 96 joined at a junction 84. Longitudinal plate or back portion 95 can have an irregular shape as shown in the figures with a top portion 82 having a pair of openings 93, and a bottom portion 83 having a pair of openings 94.

Preferably longitudinal plate/back portion 95 has a shape enabling it to attach to a transverse bar portion 21 of a roll bar 1, 70, 111 at center/lateral portion 44 and at each longitudinal support or leg 43. As discussed above, preferably openings 94 are slotted or otherwise have a shape that enable longitudinal plate/back portion 95 to attach to varying sizes roll bars that can have different widths between longitudinal supports or legs 43. A plate 3, fasteners 14, 8, u-bolts 4, washers 5, and nuts 6 can be used to couple a longitudinal plate/back portion 95 to roll bar 1, 70, 111 at each opening 93, 94. A plate 3 can be positioned on a rear/back side 42 of each longitudinal support or leg 43 of transverse bar portion 21 so that a fastener 14 of each plate 3 can be positioned through an opening 94. The location of a fastener 14 within an opening 94 can be changed based on the particular roll bar 1, 70, 111 that the support frame or rack 80 is to be installed on, e.g., a fastener 14 can be about centered as shown in the figures in opening 94 or can be positioned through opening 94 at any location to the right or left of a center of opening 94 as needed so that each fastener 14 of a plate 3 on a rear/back side 42 of each longitudinal support or leg 43 of transverse bar portion 21 can be inserted through an opening 94. Each plate 3 on a rear/back side 42 of each longitudinal support or leg 43 can be coupled to longitudinal support or leg 43 using fasteners 4, e.g., u-bolts, as shown and/or as previously described herein. Fasteners 4, e.g., u-bolts, can be secured therein using a washer 5 and nut 6.

The location of plates 3 along each longitudinal support or leg 43 of transverse bar portion 21 preferably is selected so that openings 93 of top portion 82 of longitudinal plate/back portion 95 are able to receive a fastener 14 of a plate 3 positioned on rear/back side 42 of center/lateral portion 44 of transverse bar portion 21. Two openings 93 are included in the embodiment as shown. If desired, longitudinal plate/back portion 95 can have only one opening 93 for coupling to transverse bar portion 21. Openings 93 can also be slotted if desired but do not need to be in order to enable a universal application as described.

Lateral plate/bottom portion 96 of support frame or rack 80 preferably includes one or more openings 99 which can be used for coupling a rack portion 16 thereto. Rack portion 16 can include a pair of saddles 85 that can a receive a tank 7. A saddle 85 can be the same or similar to a saddle 52 and having a pair of side plates 98 with openings 89 and center or bottom plate 97. Preferably in this embodiment center or bottom plate 97 of saddle 85 includes one or more openings 91.

Saddles 85 can be coupled to lateral plate/bottom portion 96 using a fastener 86, e.g., a bolt, which can be a carriage bolt, a washer 5 and a nut 6. Fastener 86 can be positioned through an opening 91 of a saddle 85 and opening 99 of lateral plate/bottom portion 96 and secured therein using a washer 5 and nut 6. Preferably an opening 99 has a shape enabling the distance between a pair of saddles 85 to be adjusted on lateral plate/bottom portion 96, e.g., opening 99 can be a slotted opening. This enables adjusting the saddles 85 location based on different size tanks 7 to be held within saddles 85. Alternatively, if desired a saddle 52 can also be used and potentially welded or otherwise coupled to lateral plate/bottom portion 96.

FIGS. 20 to 23 show a fifth preferred embodiment of the apparatus of the present invention designated generally by the numeral 100. A support frame or rack 100 can be removably attached to a roll bar of a wheeled vehicle 30 in a retracted/lowered position. Support frame or rack 100 is another universal rack of the present invention that is adapted for coupling to roll bars of different sizes or dimensions.

A support from or rack 100 includes a lateral plate 103 that can be the same or similar shape to a longitudinal plate/back portion 95 of a support frame or rack 80. Lateral plate 103 can include a top portion 107 with one or more openings 106 and a bottom portion 108 with one or more openings 104. Lateral plate 103 can be placed on forward face 41 of transverse bar portion 21 of a roll bar 1, 70 when transverse bar portion 21 is in a lower/retracted position, e.g., preferably so that a longitudinal support or leg 43 of transverse bar portion 21 is positioned at or about a 90 degree angle with respect to a longitudinal support/leg 75 of immovable longitudinal lower bar portion 33. If a roll bar 70 is used that does not have a hinge that acts as a stop to keep transverse bar portion 21 at or about a 90 degree angle with respect to a longitudinal support/leg 75 of immovable longitudinal lower bar portion 33, a support or stop 65 can also be used in this embodiment and adapted so that both bottom portion 108 of lateral plate 103 and a flange portion 62 of support or stop 65 can be coupled to a longitudinal support or leg 43 of transverse bar portion 21 when in a lowered/retracted position.

Lateral plate 103 preferably is positioned on forward face 41 of transverse bar portion 21 in the lowered/retracted position so that the one or more openings 106 can align with center/lateral portion 44 of transverse bar portion 21 and so that openings 104 can align with a longitudinal support or leg 43. Openings 104 can be the same or similar to openings 94. An opening 106 can be the same or similar to an opening 93. Openings 104 are preferably adapted to compensate for the varying dimensions of different roll bars on any particular wheeled lawn care apparatus 30 so that a support frame or rack 100 can be attached to any roll bar 1, 70 on any given wheeled lawn care apparatus 30. Openings 104 most preferably are slotted having a length of at least between about ¼ to 8 inches. Openings 104 can also be slotted having a desired length of between about more than 0 inches to 10 inches, or other desired length. A plate 3, fasteners 4, 14, 8, and washers 5 and nuts 6 can be used to connect lateral plate 103 to forward face 41 of transverse bar portion 21 in a lowered position at an opening 104 or 106. As discussed above, preferably openings 104 are slotted or otherwise have a shape that enable lateral plate 103 to attach to varying sizes roll bars 1, 70 that can have different widths between longitudinal supports or legs 43 of a transverse bar portion 21. A plate 3 and fasteners 4, 14, 8 can be used to couple a lateral plate 103 to roll bar 1, 70 at each opening 104, 106.

A lateral plate 103 can be positioned on a forward face 41 of each longitudinal support or leg 43 of transverse bar portion 21 so that a fastener 14 of each plate 3 can be positioned through an opening 104. The location of a fastener 14 within an opening 104 can change based on the dimensions of a particular roll bar 1, 70 that the support frame or rack 100 is to be installed on, e.g., a fastener 14 can be about centered within an opening 104 as shown in the figures or positioned through opening 104 at any location to the right or left of a center of opening 104 as needed so that each fastener 14 of a plate 3 on a forward face 41 of each longitudinal support or leg 43 of transverse bar portion 21 can be inserted through an opening 104. Each plate 3 on forward face 41 of each longitudinal support or leg 43 can be coupled to longitudinal support or leg 43 using fasteners 4, e.g., u-bolts, as shown and/or as previously described herein.

The location of plates 3 along each longitudinal support or leg 43 of transverse bar portion 21 preferably is selected so that openings 106 of top portion 107 are able to receive a fastener 14 of a plate 3 positioned on forward face 41 of center/lateral portion 44 of transverse bar portion 21. Two openings 106 are included in the embodiment as shown. If desired, lateral plate 103 can have only one opening 106 for coupling to transverse bar portion 21. Openings 106 can also be slotted if desired but do not need to be in order to enable a universal application as described.

Lateral plate 103 of support frame or rack 100 preferably includes one or more openings 105 which can be used for coupling a rack portion 16 thereto. Rack portion 16 can include a pair of saddles 85 that can a receive a tank 7. A saddle 85 can be the same or similar to a saddle 52 and having a pair of side plates 98 and center or bottom plate 97. Preferably in this embodiment center or bottom plate 97 of saddle 85 includes one or more openings 91.

Saddles 85 can be coupled to lateral plate 103 using a fastener 86, e.g., a bolt, which can be a carriage bolt, a washer 5 and a nut 6. Fastener 86 can be positioned through an opening 91 of a saddle 85 and opening 105 of lateral plate 103 and secured therein using a washer 5 and nut 6. Preferably an opening 105 has a shape enabling the distance between a pair of saddles 85 to be adjusted on lateral plate 103, e.g., opening 105 can be a slotted opening. This enables adjusting the saddles 85 location based on different size tanks 7 to be held within saddles 85. Alternatively, if desired, a saddle 52 can also be used and potentially welded or otherwise coupled to lateral plate 103.

FIGS. 24-28 show a sixth preferred embodiment of a support frame or rack 110 which can be coupled to a roll bar 111, having a back side 112 and a front side 113, of the type that is not designed to fold down or retract to a lowered position. This embodiment may be desired on a wheeled lawn care apparatus 53 of the type with a roll bar 111 that cannot be lowered. A support frame or rack 110 is similar to a support frame or rack 40 as shown in FIGS. 7-9, except it includes a flanged connector 115 with openings 120 for attaching to a back side 112 of roll bar 111, instead of a longitudinal mounting plate 20. Pins 114 are also fixedly coupled, e.g., welded to back side 112 of roll bar 111 in this embodiment. Locking pins 8 can be used to couple support frame or rack 110 to roll bar 111 when pins 114 are inserted through openings 120 of flanges 115. If desired, support frame or rack 110 can also be fixedly attached to roll bar 111 and not removable. In this embodiment, a connector plate 3 and fastener 4, e.g., a u-bolt, are not needed to secure a support frame or rack to roll bar 111. A support frame or rack 110 is shown with an alternative bottom portion 125 that can be incorporated in a support frame or rack of the present invention as described herein if desired. As shown, a bottom portion 125 does not include flanges 26 under saddles 16. A support frame or rack 110 has a bottom portion 125 including side portions/diagonal plates 122 and a center plate 123. Rack portion 117 for supporting and/or receiving a tank 7 includes a pair of saddles 116, each having a center/bottom plate 118 and side plates 119, which are shown on a diagonal. Side plates 119 can include openings 126, e.g., for receiving a strap or cord 9. Side plates 119 can be narrower, for example, if desired, than center/bottom plate 118 as shown.

It is also possible that a support frame or rack 110 can be coupled to a roll bar 1 or 70 of a wheeled lawn care apparatus 30 in a lowered or retracted position if desired using openings 121 on lateral plate 124, and a connector plate 3, fastener 14, and locking pin 8, for example, if desired. A support frame or rack 110 can also be coupled to a roll bar 1 or 70 of a wheeled lawn care apparatus 30 in an extended/upright position.

FIG. 29 shows a seventh preferred embodiment of the apparatus of the present invention designated generally by the numeral 130. A support frame or rack 130 can be removably attached to a roll bar 1, 70, 111 of a wheeled vehicle 30, 53 in a raised/upright position, or to a roll bar 1, 70 of wheeled vehicle 30 in retracted/lowered position. This is an alternative embodiment of support frame or rack 10, that is a universal rack adapted for coupling to roll bars of different sizes or dimensions. In a support frame or rack 130, openings 131, 132 are provided which can be the same or similar to an opening 94 or 104, e.g., can be a slotted opening, of the embodiments shown in FIGS. 16-23, instead of an opening 11 or 12 as shown in FIGS. 1-6. Openings 131, 132 of a support frame or rack 130 are preferably adapted to compensate for variations in dimensions of different roll bars so that a support frame or rack 130 can be attached to any roll bar 1, 70, 111 on any given wheeled lawn care apparatus 30, 53. Openings 131, 132 most preferably are slotted having a length of at least between about ¼ to 8 inches. Openings 131, 132 can also be slotted having a desired length of between more than 0 inches to 10 inches, or other desired length.

FIG. 30 shows an eighth preferred embodiment of the apparatus of the present invention designated generally by the numeral 140. A support frame or rack 140 can be removably attached to a roll bar 1, 70, 111 of a wheeled vehicle 30 53 in a raised/upright position. This is an alternative embodiment of support frame or rack 40, that is a universal rack adapted for coupling to roll bars of different sizes or dimensions. In a support frame or rack 140, opening 141 can be the same or similar to an opening 94 or 104, e.g., can be a slotted opening, of the embodiments shown in FIGS. 16-23, instead of an opening 11 as shown in FIGS. 7-9. Opening 141 of a support frame or rack 140 is preferably adapted to compensate for variations in dimensions of different roll bars so that a support frame or rack 140 can be attached to any roll bar 1, 70, 111 on any given wheeled lawn care apparatus 30, 53. Opening 141 most preferably is slotted having a length of at least between about ¼ to 8 inches. Opening 141 can also be slotted having a desired length of between more than 0 inches to 10 inches, or other desired length.

In one or more preferred embodiments, a support frame or rack of the present invention, e.g., support frame or rack 10, 40, 50, 80, 100, 110, 130, 140 can be removably coupled to a wheeled lawn care apparatus, lawn mower or tractor 30, 53. In preferred embodiments, a support frame or rack of the present invention, e.g., a support frame 10, 40, 50, 80, 100, 110, 130, 140 can be selectively used on a lawn mower or a tractor, or on more than one lawn mower or tractor at different times, based on which wheeled vehicle is selected for use for a particular task.

One or more embodiments of a support frame or rack of the present invention as described herein can also be adapted to be fixedly connected to a roll bar if desired.

In other embodiments, a support frame or rack of the present invention, e.g., a support frame or rack 10, 40, 50, 80, 100, 110, 130, 140 of the present invention can be formed as an integral part of a roll bar of a lawn mower or tractor or other wheeled lawn care apparatus during manufacture.

In one or more preferred embodiments, a support frame or rack of the present invention, e.g., a support frame or rack 10, 40, 50, 80, 100, 110, 130, 140 can be sold separately from a lawn mower or tractor or other wheeled lawn care apparatus and removably coupled to a roll bar thereof.

In one or more preferred embodiments, a support frame or rack of the present invention, e.g., a support frame or rack 10, 40, 50, 80, 100, 110, 130, 140 can be included with a lawn mower or tractor or other wheeled lawn care apparatus when purchased and designed to be removable when not in use.

A support frame or rack of the present invention, e.g., a support frame or rack 10, 40, 50, 80, 100, 110, 130, 140 can be made from metal, e.g., aluminum or steel metals; or a plastic material; or a composite material. Preferably a support frame or rack of the present invention, e.g., a support frame or rack 10, 40, 50, 80, 100, 110, 130, 140 is made from aluminum or other recyclable, lightweight metal.

A support frame or rack of the present invention, e.g., a support frame or rack 10, 40, 50, 80, 100, 110, 130, 140 preferably is configured to support a sprayer tank 7 thereon, e.g., a ¥31" tank having an interior for housing a fluid therein, e.g., a 0 to 30 gallon tank. A typical sprayer tank 7 that can be used with the present invention is commercially available, e.g., a WORKHORSE® or IRONTON® brand tank, and can be of the type having a handle 28 and a pump 29, and hose 46 with a sprayer nozzle 45 for dispensing fluid therefrom.

As discussed, a support frame of the present invention can also be adapted to hold an even larger tank, e.g., a tank that can hold 31 to 300 gallons, if desired. For tanks of this size, the dimensions of the support frame can be increased as may be necessary to support the larger tank and additional load bearing members or supports can be included as needed to support the heavier weight of such a larger tank.

A connector plate of the present invention, e.g., a connector plate 3 or 64 can be made from metal e.g., aluminum or steel.

If desired, one or more embodiments of a support frame or rack 10, 50 can be adapted for use on a roll bar 1 or 70 only in a lowered/retracted position, e.g., a longitudinal mounting plate 20 can be eliminated if desired.

The following is a list of parts and materials suitable for use in the present invention:

| PARTS LIST: | |
|---|---|
| PART NUMBER | DESCRIPTION |
| 1 | rollover protective structure/roll bar/bar |
| 2 | mounting frame portion/tank frame |
| 3 | roll bar mount/bar mount/connector plate |
| 4 | fastener, e.g., u-bolt |
| 5 | fastener, e.g., washer |
| 6 | fastener, e.g., nut |
| 7 | tank/sprayer tank |
| 8 | pin with locking ring/locking pin (alternatively can be a threaded fastener, e.g., a treated bolt and nut) |
| 9 | strap/cord/bungee strap/bungee cord/band |
| 10 | support frame/frame/rack/sprayer rack |
| 11 | opening |
| 12 | opening |
| 13 | opening |
| 14 | fastener, e.g., bolt or pin or lynch pin with ring |
| 15 | opening |
| 16 | rack portion |
| 17 | plate/side wall of rack portion |
| 18 | plate/cross beam of rack portion |
| 19 | lateral plate/lateral mounting plate |
| 20 | longitudinal plate/longitudinal mounting plate |
| 21 | roll bar transverse bar portion/upper bar portion/upper section |
| 22 | side beam/diagonal plate |
| 23 | sidewall of side beam/diagonal plate |
| 24 | sidewall of side beam/diagonal plate |
| 25 | center portion of side beam |
| 26 | flanged connector |
| 27 | hinge |
| 28 | handle |
| 29 | pump |
| 30 | wheeled lawn care vehicle/lawn mower/tractor/zero turn mower |
| 31 | recess/recessed area |
| 32 | end plate |
| 33 | immovable longitudinal lower bar portion of roll bar |
| 34 | first end lateral plate/lateral mounting plate |
| 35 | second end lateral plate/lateral mounting plate |
| 36 | upper transverse end of connector plate |
| 37 | lower transverse end of connector plate |
| 38 | leg of u-bolt/fastener 4 |
| 39 | longitudinal member of connector plate |
| 40 | support frame/frame/rack/sprayer rack |
| 41 | forward side transverse portion roll bar/forward face |
| 42 | rear/back side transverse portion roll bar |
| 43 | leg/longitudinal support of roll bar transverse portion |
| 44 | center/lateral portion of roll bar transverse portion |
| 45 | nozzle |
| 46 | hose |
| 47 | end plate |
| 48 | L-shape plate |
| 49 | central portion flanged connector |
| 50 | support frame/frame/rack/sprayer rack |
| 51 | leg or side portion of immovable longitudinal lower bar portion 33 |
| 52 | saddle |
| 53 | lawn mower/tractor/wheeled lawn care apparatus |
| 54 | wheel |
| 55 | chassis |
| 56 | seat |
| 57 | engine |
| 58 | steering device |
| 60 | flanged portion of support or stop 65 |
| 61 | cross beam/diagonal beam/diagonal support |
| 62 | flanged portion |
| 63 | bottom plate/center portion of flanged portion 62 |
| 64 | connector plate |
| 65 | support or stop of roll bar, e.g., a diagonal support |
| 66 | opening |
| 67 | opening |
| 68 | cord/tie |
| 69 | opening |

-continued

PARTS LIST:

| PART NUMBER | DESCRIPTION |
| --- | --- |
| 70 | roll over protective bar/roll bar/bar |
| 71 | side of flanged connector 62 |
| 72 | side plate/center portion of flanged connector 60 |
| 73 | side of flanged connector 60 |
| 74 | connector plate center plate |
| 75 | leg/longitudinal support of immovable longitudinal lower bar portion of roll bar |
| 80 | support frame/frame/rack/sprayer rack |
| 82 | top portion of longitudinal plate 95 |
| 83 | bottom portion of longitudinal plate 95 |
| 84 | junction |
| 85 | saddle/adjustable tank mount |
| 89 | opening |
| 86 | carriage bolt/fastener |
| 91 | opening |
| 93 | opening |
| 94 | opening, e.g., slotted opening |
| 95 | longitudinal plate/back portion of support frame 80 |
| 96 | lateral plate/bottom portion of support frame 80 |
| 97 | bottom/center plate saddle 85 |
| 98 | side plate of saddle 85 |
| 99 | opening, e.g., slotted opening |
| 100 | support frame/frame/rack/sprayer rack |
| 103 | lateral plate of support frame 100 |
| 104 | opening, e.g., slotted opening |
| 105 | opening, e.g., slotted opening |
| 106 | opening |
| 107 | top portion of lateral plate 103 |
| 108 | bottom portion of lateral plate 103 |
| 110 | support frame/frame/rack/sprayer rack |
| 111 | roll over protective structure/roll bar/bar |
| 112 | back side roll bar 111 |
| 113 | front side roll bar 111 |
| 114 | pin |
| 115 | flanged connector |
| 116 | saddle |
| 117 | rack portion |
| 118 | center/bottom plate of saddle 116 |
| 119 | side plate of saddle 116 |
| 120 | opening |
| 121 | opening |
| 122 | side portion/diagonal plate of 125 |
| 123 | center plate of 125 |
| 124 | lateral plate |
| 125 | bottom portion of frame 110 |
| 126 | opening |
| 130 | support frame/frame/rack/sprayer rack |
| 131 | opening |
| 132 | opening |
| 140 | support frame/frame/rack/sprayer rack |
| 141 | opening |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the claims.

The invention claimed is:

1. A support frame for mounting to a wheeled vehicle for supporting a sprayer tank during spraying or when not spraying, the support frame comprising:
   a) a lateral mounting plate having a first end and a second end, and having a first opening positioned on the first end and a second opening positioned on the second end;
   b) a first longitudinal mounting plate having a third opening and a second longitudinal mounting plate having a fourth opening, wherein the first longitudinal mounting plate is coupled to the lateral mounting plate at the first end and the second longitudinal mounting plate is coupled to the lateral mounting plate at the second end;
   c) a pair of connector plates, each said connector plate having a first fastener, a first connector plate end and a second connector plate end, the first connector plate end having a pair of fifth openings and the second connector plate end having a pair of sixth openings, the pair of fifth openings adapted for receiving a second fastener and the pair of sixth openings adapted for receiving a third fastener;
   d) a rack portion having a lower fixed section and an upper section that is pivotally connected to said lower section;
   e) wherein the frame is adapted to be removably coupled to the wheeled vehicle having a roll bar upper section when the roll bar upper section is extended to an elevated position or retracted to a lowered position;
   f) wherein each said first fastener of the pair of connector plates is configured to removably couple one said connector plate to the frame at the lateral mounting plate, at the first longitudinal mounting plate, or at the second longitudinal mounting plate;
   g) wherein the second fastener and the third fastener are each adapted to fit at least partially around the roll bar and to removably couple one said connector plate to the roll bar;
   h) wherein the pair of connector plates couple the frame to the roll bar in the elevated position when the first fastener of one said connector plate is positioned in the third opening of the first longitudinal mounting plate and the first fastener of the other said connector plate is positioned in the fourth opening of the second longitudinal mounting plate and when said second fastener is positioned at least partially around the roll bar and through the pair of fifth openings of each said connector plate and the third fastener is positioned at least partially around the roll bar and through the pair of sixth openings of each said connector plate; and
   i) wherein the pair of connector plates couple the frame to the roll bar in the lowered position when the first fastener of one said connector plate is positioned in the first opening on the first longitudinal mounting plate and the first fastener of the other said connector plate is positioned in the second opening on the longitudinal mounting plate and when said second fastener is positioned at least partially around the roll bar and in the pair of fifth openings of each said connector plate and said third fastener is positioned at least partially around the roll bar and in the pair of sixth openings of each said connector plate.

2. The frame of claim 1 wherein the rack portion is adapted to support the sprayer tank having a volume of between 5-30 gallons of fluid therein.

3. The frame of claim 2 wherein the rack portion is coupled to the lateral mounting plate and has a pair of cross beams each with a cross beam first end and a cross beam second end, a first side plate and a second side plate, wherein the first side plate extends upward at an angle from the cross beam first end and the second side plate extends upward at an angle from the cross beam second end, and wherein the pair of cross beams are adapted to support the sprayer tank in between said first side plates and said second side plates.

4. The frame of claim 3 wherein the rack portion can include one or more openings through which a strap or bungee cord can be threaded through to help secure the sprayer tank to the rack portion.

5. The frame of claim 1 further comprising one or more flanged connectors having an at least substantially u-shape for being positioned at least partially around the roll bar and resting on the roll bar when in the lowered position.

6. The frame of claim 5 further comprising a pair of opposing side beams, each of the pair of opposing side beams having a center portion, a first sidewall portion and a second sidewall portion wherein the center portion of each of the pair of opposing side beams extends from the lateral mounting plate to the rack portion at an angle.

7. The frame of claim 6 wherein the first sidewall portion and the second sidewall portion defines a sidewall of one said flanged connector.

8. The frame of claim 3 wherein each cross beam of the rack portion is sized to fit within a recess of the tank.

9. The frame of claim 1 wherein the roll bar has a lower portion that does not retract and an upper portion that does retract and wherein the pair of connector plates are adapted to couple the frame to the upper portion of the roll bar when in the lowered position at an angle of at least substantially 90 degrees respective to the lower portion of the roll bar.

10. The frame of claim 9 further comprising a roll bar support adapted to hold the upper portion of the roll bar in an at least substantially horizontal position.

11. The frame of claim 10 wherein the roll bar support is coupled to the lower portion of the roll bar.

12. The frame of claim 1 wherein the roll bar has a lower portion that does not retract and an upper portion that does retract and wherein the pair of connector plates are adapted to couple the frame to the upper portion of the roll bar when in the lowered position that is at least substantially horizontal respective to the lower portion of the roll bar.

13. The frame of claim 1 wherein the first opening, the second opening, the third opening, and the fourth opening are slotted.

14. The frame of claim 6 wherein the first opening, the second opening, the third opening, and the fourth opening are slotted.

* * * * *